US006857013B2

(12) United States Patent
Ramberg et al.

(10) Patent No.: US 6,857,013 B2
(45) Date of Patent: *Feb. 15, 2005

(54) REMOTE ANOMALY DIAGNOSIS AND RECONFIGURATION OF AN AUTOMATIC DATA COLLECTION DEVICE PLATFORM OVER A TELECOMMUNICATIONS NETWORK

(75) Inventors: Jon R. Ramberg, Lynnwood, WA (US); Jeffrey M. Hunt, Everett, WA (US); Paul David Shoeman, Lynnwood, WA (US); James T. Katsandres, Seattle, WA (US)

(73) Assignee: Intermec IP.Corp., Beverly Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/240,108
(22) Filed: Jan. 29, 1999

(65) Prior Publication Data
US 2003/0014505 A1 Jan. 16, 2003

(51) Int. Cl.[7] .............................................. G06F 15/173
(52) U.S. Cl. ...................................... 709/223; 709/220
(58) Field of Search .................................. 709/223, 224, 709/227, 228, 331, 226, 200, 238, 320, 221, 217, 253, 243, 220, 209; 345/356, 440, 347; 707/10, 104; 370/241, 252, 466; 235/375, 383; 710/62, 103; 702/121; 706/45; 600/300; 379/1; 713/153; 455/557

(56) References Cited

U.S. PATENT DOCUMENTS 4,527,237 A * 7/1985 Frieder et al. .............. 709/253
4,801,786 A   1/1989 Stobbe ....................... 235/377

(List continued on next page.)

OTHER PUBLICATIONS ifsm651 ; http://userpages.umbc.edu/~palmar/; 1997.*

(List continued on next page.)

*Primary Examiner*—Thong Vu
(74) *Attorney, Agent, or Firm*—Seed IP Law Group PLLC

(57) ABSTRACT

The invention provides a system and method for remotely diagnosing and repairing a plurality of Automatic Data Collection ("ADC") device platforms. A remote service technician utilizes a computing system having browsing software that communicates with a network of ADC platform devices. Diagnostic queries for particular ADC devices may be retrieved by the browsing software from a diagnostic server that sends Hypertext Mark-Up Language ("HTML") documents, Dynamic Hypertext Mark-Up Language ("DHTML") documents, and/or Extensible Mark-Up Language ("XML") documents containing appropriate diagnostic applets. The remote technician sends diagnostic queries to a Simple Network Management Protocol ("SNMP") master agent at the ADC device platform, and a translator translates the diagnostic queries sent to the ADC device platform into a format suitable for reception by its ADC devices in order to effect anomaly diagnosis and functionality restoration. Another translator translates data received from the ADC device into the SNMP format for transmission to the remote service technician in order for the remote service technician to perform diagnostic analysis. The SNMP master agent communicates with the remote computing system using the Transmission Control Protocol ("TCP"), the User Datagram Protocol/Internet Protocol ("UDP/IP"), and/or the User Datagram Plus Protocol ("UDP+"). The ADC platform device may also utilize a wireless communication system for communicating with the remote service technician.

41 Claims, 15 Drawing Sheets

U.S. PATENT DOCUMENTS

| | | | | |
|---|---|---|---|---|
| 4,825,058 A | | 4/1989 | Poland | 235/472 |
| 5,034,598 A | | 7/1991 | Poland | 235/435 |
| 5,036,479 A | * | 7/1991 | Prednis et al. | 702/121 |
| 5,052,020 A | | 9/1991 | Koenck et al. | 375/62 |
| 5,070,536 A | | 12/1991 | Mahany et al. | 455/67 |
| 5,121,342 A | | 6/1992 | Szymborski et al. | 364/514 |
| 5,218,188 A | | 6/1993 | Hanson | 235/375 |
| 5,261,079 A | | 11/1993 | Celi, Jr. | 395/500 |
| 5,295,154 A | | 3/1994 | Meier et al. | 375/1 |
| 5,309,351 A | | 5/1994 | McCain et al. | 364/132 |
| 5,322,991 A | | 6/1994 | Hanson | 235/472 |
| 5,349,678 A | | 9/1994 | Morris et al. | 395/800 |
| 5,365,546 A | | 11/1994 | Koenck et al. | 375/9 |
| 5,404,493 A | * | 4/1995 | Bolme et al. | 710/62 |
| 5,418,684 A | | 5/1995 | Koenck et al. | 361/680 |
| 5,425,051 A | | 6/1995 | Mahany | 375/202 |
| 5,440,564 A | | 8/1995 | Ovadia et al. | 370/112 |
| 5,471,596 A | | 11/1995 | Brown, III | 395/375 |
| 5,490,252 A | * | 2/1996 | Macera et al. | 709/249 |
| 5,572,512 A | | 11/1996 | Cutler, Jr. et al. | 370/13 |
| 5,577,229 A | | 11/1996 | Wakerly | 395/474 |
| 5,579,367 A | * | 11/1996 | Raymond et al. | 379/1 |
| 5,586,281 A | | 12/1996 | Miyama et al. | 395/405 |
| 5,604,516 A | | 2/1997 | Herrod et al. | 345/168 |
| 5,623,603 A | | 4/1997 | Jiang et al. | 395/200.04 |
| 5,724,510 A | * | 3/1998 | Arndt et al. | 709/220 |
| 5,742,762 A | * | 4/1998 | Scholl et al. | 709/200 |
| 5,748,884 A | | 5/1998 | Royce et al. | |
| 5,761,428 A | * | 6/1998 | Sidey | 709/223 |
| 5,799,317 A | * | 8/1998 | He et al. | 707/104 |
| 5,857,190 A | * | 1/1999 | Brown | 707/10 |
| 5,893,083 A | * | 4/1999 | Eshghi et al. | 706/45 |
| 5,919,248 A | * | 7/1999 | Kahkoska et al. | 709/224 |
| 5,961,594 A | * | 10/1999 | Bouvier et al. | 709/223 |
| 5,974,237 A | * | 10/1999 | Shurmer et al. | 709/224 |
| 5,979,757 A | * | 11/1999 | Tracy et al. | 253/383 |
| 5,982,753 A | * | 11/1999 | Pendleton et al. | 370/252 |
| 5,991,806 A | * | 11/1999 | McHann, Jr. | 709/224 |
| 6,028,605 A | * | 2/2000 | Conrad et al. | 345/354 |
| 6,041,041 A | * | 3/2000 | Ramanathan et al. | 370/241 |
| 6,108,782 A | * | 8/2000 | Fletcher et al. | 713/153 |
| 6,122,664 A | * | 9/2000 | Boukobza et al. | 709/224 |
| 6,154,465 A | * | 11/2000 | Pickett | 370/466 |
| 6,163,802 A | * | 12/2000 | Lin et al. | 709/217 |
| 6,170,015 B1 | * | 1/2001 | Lavian | 709/223 |
| 6,175,868 B1 | * | 1/2001 | Lavian et al. | 709/223 |
| 6,229,540 B1 | * | 5/2001 | Tonelli et al. | 345/356 |
| 6,243,105 B1 | * | 6/2001 | Hoyer et al. | 345/440 |
| 6,263,387 B1 | * | 7/2001 | Chrabaszcz | 710/103 |
| 6,269,330 B1 | * | 7/2001 | Cidon et al. | 704/43 |
| 6,272,537 B1 | * | 8/2001 | Kekic et al. | 709/223 |
| 6,285,889 B1 | * | 9/2001 | Nykanen et al. | 455/557 |
| 6,330,597 B2 | * | 12/2001 | Collin et al. | 709/220 |
| 6,356,949 B1 | * | 3/2002 | Katsandres et al. | 709/238 |
| 6,360,255 B1 | * | 3/2002 | McCormack et al. | 709/221 |
| 6,389,464 B1 | * | 5/2002 | Krishnamurthy et al. | 709/220 |
| 6,398,105 B2 | * | 6/2002 | Ramberg et al. | 235/375 |
| 6,409,661 B1 | * | 6/2002 | Murphy | 600/300 |
| 6,460,070 B1 | * | 10/2002 | Turek et al. | 709/202 |
| 6,473,788 B1 | * | 10/2002 | Kim et al. | 709/209 |
| 6,473,798 B1 | * | 10/2002 | Grosser, Jr. et al. | 709/224 |
| 6,539,422 B1 | * | 3/2003 | Hunt et al. | 709/217 |

OTHER PUBLICATIONS

What's New? ; http://www2.staff.fh–voralberg.ac.at/~kw/javascript/NetSDK/Help/inet000.htm; 1997.*

Dr. Watson, www.cavebear.com/dwtnda/spd.html.*

Jones, Managing the MEssage: Message Tracking IEEE, Apr. 1998.*

Deri, Surfin'Network Resources across the Web, IEEE 1996.*

"Disk Drive with Embedded Hyper–Text Markup Language Server", IBM Technical Disclosure Bulletin, vol. 38, No. 12, XP000588211, Dec. 1995, p. 479.

Palmer, Roger C. "Reading, Printing and Specification of Bar Code Symbols," *The Bar Code Book*, 2nd ed., Helmers Publishing, Inc., Peterborough, New Hampshire, 1991, p. 107.

* cited by examiner

REMOTE ANOMALY DIAGNOSIS AND RECONFIGURATION OF AN AUTOMATIC DATA COLLECTION DEVICE PLATFORM OVER A TELECOMMUNICATIONS NETWORK

TECHNICAL FIELD

The invention relates generally to Automatic Data Collection ("ADC") devices and more particularly to anomaly diagnosis and functionality restoration of ADC device platforms.

BACKGROUND OF THE INVENTION

Automatic Data Collection ("ADC") device platforms, such as ADC device platforms equipped with bar code readers, have received increasing commercial attention in the past few years. ADC device platforms, such as hand-held data collection terminals, or hand-held personal computers, have been widely implemented in the retail marketplace and have garnered increasing utilization in a diverse range of application areas. The ever-decreasing cost and size of ADC device platforms has facilitated their entry into a wide variety of commercial, institutional, and governmental settings.

An ADC device platform having a bar code reader adeptly accesses and retrieves data stored in the form of a bar code label. Data representing virtually any product or service found in the marketplace may be encoded in a bar code label for later access by an ADC device platform having a bar code reader. For these reasons, ADC device platforms are now actively used for planning, controlling, producing, and analyzing most aspects of commerce. Bar code readers include laser scanners as well as other means of collecting product information, such as a bar code wand, still camera or area imager. In addition to bar code labels, other ADC data formats include Radio Frequency ("RF") tags, magnetic strips, Optical Character Recognition ("OCR"), speech input, and any symbol having encoded data therein.

In a conventional ADC device platform environment, the recipient of ADC data either physically manipulates the ADC device platform itself to retrieve the ADC data or receives the ADC data through a local, and probably proprietary, network. Thus, a typical ADC device operator is limited both in terms of the distance from which the operator may be located away from the actual device and by the complexity and versatility of the elements that comprise the ADC device network which the operator utilizes. The operator suffers from still further limitations due to the fact that many conventional ADC device platforms are not readily configurable for new ADC devices, or even for ADC devices other than those attached to the ADC device platform when it is initially sold. Yet another limitation in a conventional ADC device platform arises when an operator wishes to add a new ADC device to one of the few ADC device platforms that will accept new ADC devices. This limitation stems from the fact that many ADC devices operate using proprietary communications protocols, and even when the communications protocols are non-proprietary, the communications protocols are typically non-standard. Thus, the operator cannot simply attach a new ADC device to an existing ADC device platform and expect that the new combination will function properly. The operator typically must either return the device to the manufacturer for re-fitting with the new ADC device or request that a service technician of the new ADC device's manufacturer visit the operator's location and perform the installation on site. Finally, the above limitations, both separately and together, hinder an ADC operator's ability to diagnose and make repairs to an ADC device platform.

ADC device platforms are primarily intended for technically unsophisticated operators. The typical ADC device operator has neither adequate training nor a rudimentary understanding of the basic principles upon which the ADC device platform operates. Consequently, when a typical ADC device operator encounters an anomaly or apparent anomaly with regard to the ADC device platform, the typical ADC device operator cannot diagnose the anomaly and make any required adjustments to the ADC device platform to restore its functionality. Some apparent ADC device platform anomalies result from the typical ADC device operator's unsophistication. Some manufacturers have found that fully half of the ADC device platforms returned to them as defective, in fact, contain no defects at all. ADC device platform manufacturers are understandably eager to reduce the number of ADC device platforms returned to them as inoperable and the number of on-site service calls, especially when the ADC device platforms are in proper working condition.

SUMMARY OF THE INVENTION

Aspects of the invention provides a method and system for remotely diagnosing and reconfiguring a plurality of networked Automatic Data Collection ("ADC") device platforms. Each ADC device platform in the plurality of networked ADC device platforms contains a communications device that connects to a communications network that allows remote access by a service technician. The service technician sends diagnostic queries to the ADC device platform over the communications network. Diagnostic queries passing over the communications network to the ADC device platform may arrive in a communications format different from the format required by the various subsystems connected to the ADC device platform, such as the ADC devices.

Aspects of the invention provide a method and system for retrieving diagnostic and analytical tools for restoring a plurality of ADC devices to proper working condition. A service technician utilizes a web browser in a remote computing system to access a Hypertext Transfer Protocol ("HTTP") server and retrieve from the HTTP server Hypertext Mark-Up Language ("HTML") documents, Dynamic Hypertext Mark-Up Language ("DHTML") documents, Extensible Mark-Up Language ("XML") documents, and/or documents in other data formats over the World Wide Web, according to one embodiment of the invention. The service technician's remote computing system uses small diagnostic programs, or applets, contained in the HTML documents, DHTML documents, and/or XML documents to perform diagnostic queries on ADC device platforms, diagnose anomalies, and reconfigure malfunctioning subsystems on the ADC device platform. In each ADC device platform of the plurality of the ADC device platforms, a Simple Network Management Protocol ("SNMP") master agent communicates with the service technician's remote computing system. An SNMP subagent translates a diagnostic query forwarded by the SNMP master agent into a format suitable for reception by the subsystem to which the query was directed. The SNMP subagent translates data received from the queried subsystem into the proper format for transmission to the SNMP master agent which forwards the data to the remote computing system. Once the data arrives at the remote computing system, it may be analyzed by the service technician.

Aspects of the invention include an anomaly reporting system on an ADC device platform. The anomaly reporting system may include a subsystem for generating anomaly reporting electronic mail messages ("e-mails") that may be composed by a device operator and sent to the remote service technician. The ADC device platform may also include an anomaly reporting beacon that automatically sends a predetermined anomaly reporting e-mail to a remote service technician when activated. The anomaly reporting beacon may be activated automatically by the device operator or by the ADC device platform itself.

Aspects of the invention also provide a method and system for effecting repair of defective ADC device platforms by providing repair instructions through a communications medium, such as the World Wide Web, to the device operator. A remote service technician may either reconfigure an ADC device platform and/or instruct a device operator in how to make physical adjustments to the ADC device platform. The remote service technician may provide the device operator with instructions in mediums such as figures, text, flowcharts, and/or video clips for repair of the ADC device platform.

Aspects of the invention also provide a method and system for both uploading and downloading new versions of software for subsystems of the ADC device platform. The downloaded or uploaded software includes software upgrades provided by the ADC device platform manufacturer and software upgrades provided by the manufacturer of an ADC device subsystem, such as an ADC reader.

BRIEF DESCRIPTION OF THE DRAWINGS

An exemplary embodiment of the invention will be described below relative to the following figures. Note that similar elements and steps in the figures have the same reference number.

DETAILED DESCRIPTION OF THE INVENTION

Figure 1:
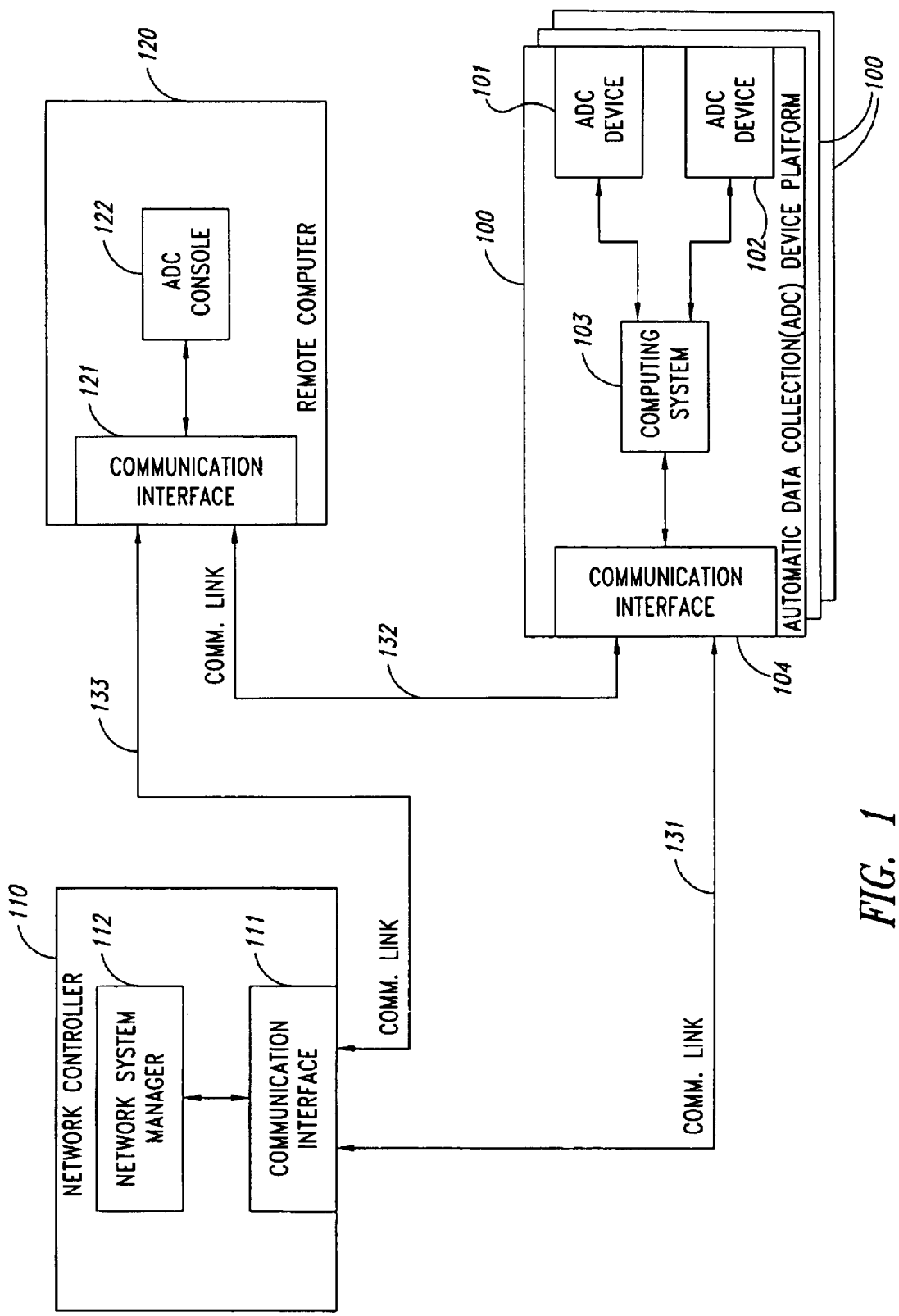
FIG. 1 depicts the system management architecture for a network of ADC device platforms.

The invention provides a method and system for remotely diagnosing and reconfiguring a plurality of networked Automatic Data Collection ("ADC") device platforms. Each ADC device platform in the plurality of networked ADC device platforms contains a network communications device. The network communications device connects to a communications network that may be remotely accessed by a service technician. The remote service technician sends commands for controlling the ADC device platform over the communications network, such as the World Wide Web, through the network communications device to the ADC device platform. Commands passing over the communications network may arrive at the ADC device platform in a communications format different from the format required by the ADC devices connected to the ADC device platform. Various subsystems on the ADC device platform translate information within the ADC device platform into appropriate communication formats.

A remote service technician may utilize a web browser on a remote computing system and retrieve status information from an ADC device platform over a communications network, such as the World Wide Web. The remote service technician uses the status information retrieved from the ADC device platform to diagnose anomalies and reconfigure the ADC device platform. In each ADC device platform of the plurality of the ADC device platforms, a Simple Network Management Protocol ("SNMP") master agent communicates with the remote computing system. An SNMP subagent translates SNMP-formatted information sent from the SNMP master agent to an appropriate ADC element in a format suitable for reception by the ADC element. The SNMP subagent translates data received from the ADC element into the SNMP format for transmission to the remote computing system where it may be analyzed by the remote service technician.

The ADC device platforms may also include an anomaly reporting system, according to embodiments of the invention. The anomaly reporting system may include a subsystem for generating diagnostic and repair electronic mail messages ("e-mails") that may be composed by a device operator and sent to the remote service technician. The ADC device platform may also include an anomaly reporting beacon that automatically sends an e-mail message to a remote service technician to report an anomaly in the ADC device platform.

Embodiments of the invention also provide a system for effecting repair of defective ADC device platforms by providing instructions through a communications medium to the device operator. A remote service technician may either reconfigure an ADC device platform and/or instruct a device operator regarding how to perform physical adjustments to the ADC device platform. The remote service technician may provide the device operator with diagrams, text, and/or video clips for repair of the ADC device platform. Embodiments of the invention also provide a simplified mechanism for both uploading and downloading new versions of software for driving subsystems of the ADC device platform.

These new software modules may be provided by the ADC device platform manufacturer or by the manufacturer of an ADC device subsystem such as an ADC reader.

The invention is particularly applicable to instrumented ADC device platforms, including hand-held ADC devices, but is also applicable to other computing systems as well. An exemplary ADC device platform suitable for use with the invention is described in "Automatic Data Collection Device Having a Network Communications Capability," U.S. Provisional Application No. 60/084,272, filed on May 4, 1998, and assigned to a common assignee. In this embodiment of the ADC device platform, an SNMP master agent communicates with the service technician's remote computing system using the Transmission Control Protocol ("TCP"), the User Datagram Protocol/Internet Protocol ("UDP/IP"), or the User Datagram Plus Protocol ("UDP+"). While the SNMP protocol specifies that it uses UDP, a variant of the SNMP protocol may be used with TCP. The User Datagram Plus Protocol ("UDP+") is further described in U.S. application Ser. No. 08/852,002, entitled, "Reliable Communication over an Unreliable Transport Layer in a Hand-Held Device using User-Configurable Timers," filed on May 6, 1997 and assigned to a common assignee. The User Datagram Plus Protocol ("UDP+") is also described in U.S. application Ser. No. 08/851,848, "Providing Reliable Communication over an Unreliable Transport Layer in a Hand-Held Device using a Persistent Session," filed on May 6, 1997 and assigned to a common assignee. The ADC platform device may also utilize a wireless communications system for all or a portion of its communications with the remote computing system.

The ADC device platform may employ a system management architecture that uses Internet technology to deliver system management functions to a remote service technician and uses SNMP for communication with ADC device platforms. The ADC device platform network is scaleable from a minimal system having a few ADC device platforms to a large system with hundreds of ADC device platforms connected in a network. The minimal system requires only a low-cost personal computer ("PC") based web browser, while the larger system may utilize an existing SNMP infrastructure having a mixture of ADC devices.

According to one embodiment of the invention, the remote service technician's web browser uses Java applets as the user interface and SNMP to communicate with ADC device platforms. Java is an object-oriented programming language similar to C++. Java was designed to be secure and platform neutral, meaning that Java code may run on any computing platform. Java is a useful language for programming applications for the World Wide Web since users access the web from many different types of computers. Java is especially well adapted for use in programming small applications, or applets, for use in the World Wide Web. A Java applet may be loaded and run by an already running Java application, such as a web browser. Java applets may be downloaded and run by any web browser capable of interpreting Java, such as Microsoft Internet Explorer, Netscape Navigator, and Hot Java.

FIG. 1 depicts the system management architecture for a network of ADC device platforms 100 suitable for use with the present invention. The ADC device platform network comprises a network controller 110, a remote computing system 120, and one or more ADC device platforms 100. The network controller 110 includes a communication interface 111 and a network system manager 112. The remote computing system 120 includes a communication interface 121 and an ADC console 122. The ADC device platform 100 includes a communications interface 104, a computing system 103 and ADC devices 101 and 102. The ADC platform 100 is not limited to just two ADC devices, and may have only one device. The ADC devices 101 and 102 may include, for example, bar code readers, radio frequency ("RF") tag readers, SmartCard readers, magnetic stripe readers, optical character recognition ("OCR") readers, speech input recognition devices, and all forms of scanning or imaging devices. An exemplary RF tag reader suitable for use in the ADC device platform 100 is described in U.S. application Ser. No. 08/771,320, entitled, "Automatic Mode Detection and Conversion System for Printers and Tag Interrogators," filed on Apr. 27, 1998 and assigned to a common assignee.

Using the ADC console 122, a remote operator sends commands to the ADC devices 101 and 102 through a communication link 132. Communications from the remote computing system 120 arrive at the ADC devices 101 and 102 via the computer system 103 on the ADC platform 100. In a similar manner, data collected by the ADC devices 101 and 102 may be transferred to the remote computing system 120 via the computing system 103.

The remote computing system 120 also communicates with the network controller 110 through a communication link 133. This connection allows the remote computing system 120 to communicate with both the network controller 110 and the ADC device platform 100. The network controller 110 may communicate directly with the ADC device platform 100 through a communication link 131. Using the communication link 131, the network controller 110 may alter device parameters and settings on the ADC platform 100, as described below.

Using the architecture shown in FIG. 1, a service technician at the remote computing system 120 may analyze the operating characteristics of ADC device platform 100 subsystems such as the ADC devices 101 or 102, both individually and jointly. This system architecture also allows the remote service technician to diagnose anomalies and to reconfigure the ADC platform 100 and any configurable subsystems on the ADC platform 100.

Figure 2:
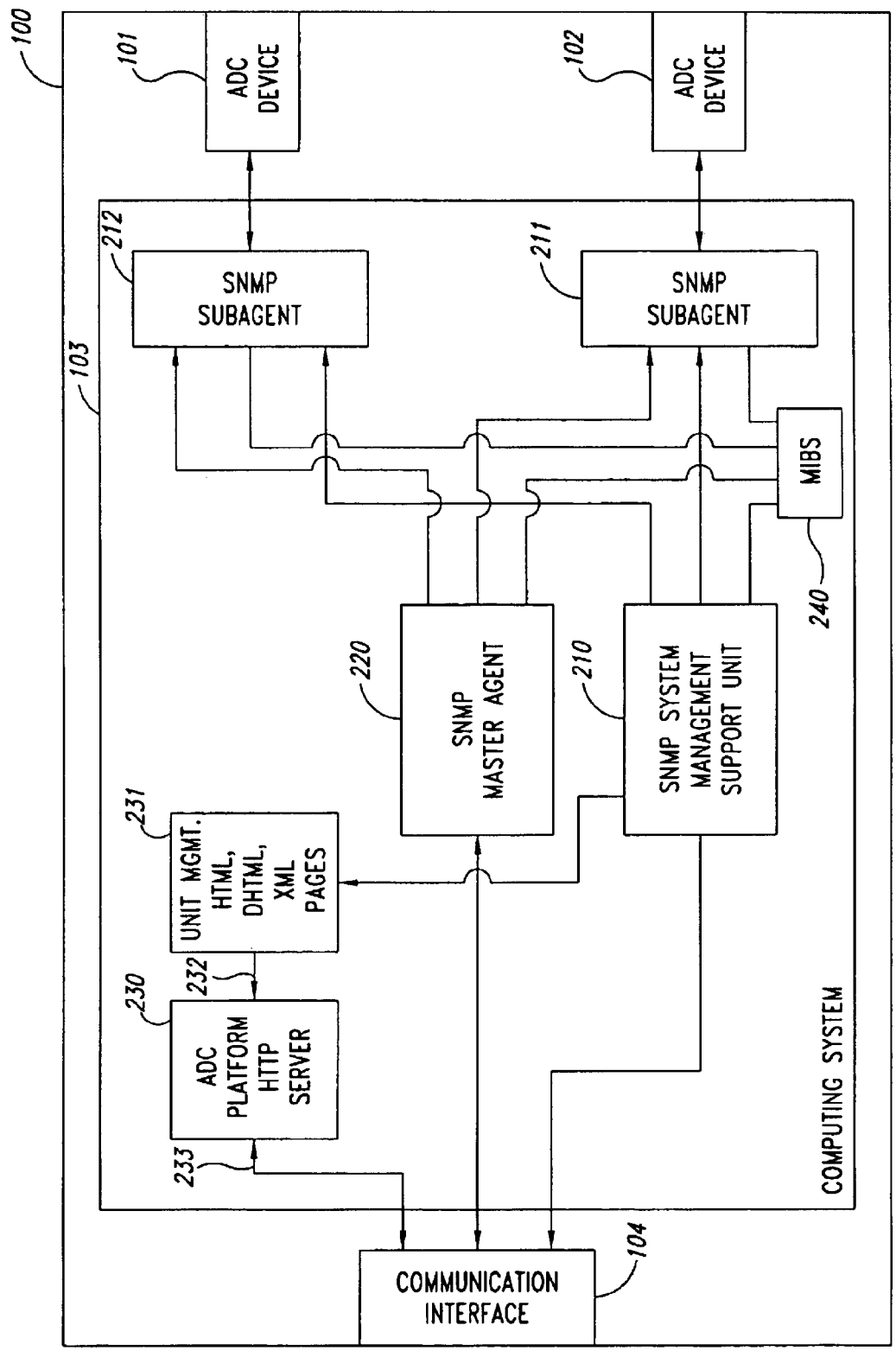
FIG. 2 provides a more detailed illustration of the network communications systems utilized by a computing system of the ADC device platform shown in FIG. 1.

FIG. 2 provides a more detailed illustration of the network communications systems utilized by the computing system 103 of the ADC device platform 100. The ADC device platform 100 utilizes the Simple Network Management Protocol ("SNMP") for network management. An SNMP management platform may control and configure all devices and subsystems on the ADC device platform 100, according to an embodiment of the invention. SNMP has recently become a well-favored network management protocol. SNMP utilizes a fetch-store paradigm in which agents (servers) maintain a set of management information such as statistics, status, and configuration values in a Management Information Base ("MIB"). The elements of a network management architecture in an SNMP manager/agent model consists of a manager, a managed system (the ADC device platform 100), a database of management information and a network protocol. The manager provides the user interface between the remote service technician and the managed devices. Between the remote service technician and an ADC device platform, the user interface is a Graphical User Interface ("GUI") running locally or remotely, according to one embodiment of the invention.

FIG. 2 depicts an exemplary embodiment of the invention, in which the SNMP management platform utilizes three interface categories: an SNMP system management support unit 210, an SNMP master agent 220 and SNMP subagents such as SNMP subagents 211, 212. The SNMP management support unit 210 performs SNMP requests such as those that will be provided by a Java applet or application. The SNMP master agent 220 performs SNTP packet verification while the SNMP subagents 211, 212 perform the actual sending and retrieving of information from the ADC devices 101, 102. This design aids remote diagnosis of ADC device platform anomalies by standardizing ADC device platform functionality while also standardizing the organization of the ADC functionality. The design also simplifies the addition of new ADC devices. The SNMP subagents 211, 212 provide a consistent interface between the SNMP master agent 220 and the ADC devices 101, 102. The SNMP master agent 220 interface, when used with TCP/IP, is fully compliant with the RFC 1157 that articulates a standard for the SNMP protocol. Such compliance allows the SNMP master agent 220 to operate with all SNMP compliant management software.

The SNMP master agent 220 communicates with the remote service technician using SNMP. SNMP is the network management protocol of the Transmission Control Protocol/Internet Protocol ("TCP/IP"). Using SNMP, agents, such as the SNMP master agent 220, monitor the activity in various devices on the network and may report the activity to a network console such as one maintained by the remote service technician.

A Management Information Base ("MIB") describes or provides management information for SNMP devices. The MIB describes a set of objects to SNMP devices and provides information about each object, including its structure, its relationship to other objects, and the operations allowed on the object. The MIB essentially tells SNMP what pieces of information it can modify or view on the ADC device platform 100. Configuration, control, and statistics data particular to the ADC device platform 100 are described in the ADC device platform MIB. In addition to supporting the ADC device platform MIB, a MIB 240 on ADC device platform 100 also supports MIBs for: a MIB-II ("RFC 1213"), an Intermec Reader MIB, an Intermec UDP+ MIB, a Proxim Open Air Radio MIB, a Scorpion 900 MHz Radio MIB, and a 802.11 MIB ("IEEE P802.11"), and other protocols, especially RF readable tag protocols.

For example, control information about each ADC device 101, 102 is maintained in the MIB 240. The SNMP master agent 220 controls SNMP subagents 211 and 212. These two SNMP subagents 211 and 212 respectively interface with the ADC devices 101 and 102. The ADC devices 101 and 102 may each operate under a different communications protocol or system. As described above, the ADC device platform 100 may be equipped with a wide variety of ADC device types, such as bar code readers and RF tag readers. Each of these exemplary ADC devices may operate under different protocols, and the MIB 240 includes information related to these protocols, according to an exemplary embodiment of the invention. The SNMP subagents 211 and 212 translate between the communications protocol of ADC devices 101 and 102 and the standardized SNMP protocol using information from the MIB 240. Adding a new ADC device to the ADC device platform 100 requires only adding a new SNMP subagent and storing relevant information in the MIB 240, regardless of the new ADC device's communication protocol.

A manager ("client") accesses information in the MIB 240 using three operations: Get, Get-Next, and Set. "Get" allows a manager to retrieve the value of an object. "Get-Next" allows a manager to retrieve the value of the next object instance in a data store without necessarily knowing the name of the object. "Set" allows a manager to change the value of one or more object.

Both remotely operated SNMP management applets and locally operated SNMP applications use management interfaces that provide a mechanism for performing SNMP "Get" and "Set" operations for retrieving and modifying information in a network node, such as the ADC device platform 100. SNMP "Set" requests change one or more values of a MIB object in the MIB 240. If an invalid value is given, an error is returned and none of the changes take effect. Changes may otherwise take effect immediately or after the ADC device platform 100 is reinitialized, depending on the variable. The "Set" request returns "success" only when all the changes have been applied successfully. SNMP "Get" request retrieves one or more MIB item values. The SNMP "Get-Next" request retrieves one or more MIB object values in the MIB 240. Upon receipt of a "Get-Next" request, the SNMP master agent 220 retrieves the next MIB entry based on the object identifier provided for each OID in the received list. If the "Get" or "Get-Next" requests provide an invalid OID or community name, an error is returned. The "Set," "Get," and "Get-Next" requests may receive input from the remote computing system 120 and format an SNMP packet to be delivered to the ADC device platform SNMP master agent 220.

SNMP also provides traps, or unacknowledged messages, sent asynchronously from the SNMP master agent 220 and the SNMP subagents 211, 212 to the SNMP management support unit 210 to notify the SNMP management support unit 210 of an exception condition. SNMP traps allow the SNMP management support unit 210 to discover anomalous situations whose resolution may ultimately require intervention by a remote service technician or the device operator. SNMP primarily uses polling to gather information about a network node, such as the ADC platform 100, which produces traps that alert the management support unit 210 that additional polling is necessary. Since traps are unacknowledged, they cannot be used to replace SNMP polling.

SNMP may also provide the network protocol and utilize a UDP transport within an IP communications stack. UDP may also be bundled with TCP in the communications stack, while in other embodiments UDP is not bundled with TCP in the communications stack. Since the ADC device platform 100 uses SNMP, the ADC device platform 100 may be managed anywhere on a SNMP-enabled network via a SNMP management station such as HP Openview or IBM's NetView. This embodiment also provides a Java web browser interface that allows a remote service technician to reconfigure one or more ADC device platforms 100 from anywhere on the network. The embodiment further provides Java applets that perform system reconfiguration tasks for the ADC device platforms 100 in the network. This applet may include a graphical user interface ("GUI") that operates from both the network controller 110 and from a web browser on the remote computing system 120.

A remote service technician may perform file transfer, view device performance statistics, perform device reconfiguration, and provide firmware upgrades via the World Wide Web or another communications network. The remote service technician may view a map of all ADC device platforms 100 on the network and their current status if granted appropriate access privileges by the network controller 110. Java applets send SNMP requests to a selected ADC device platform 100 to retrieve device data. The Java applets may include a security authentication module that varies from user-to-user based on a security profile. Depending on their individual security profiles, different remote service technicians may have different capabilities. For example, an ADC device platform manufacturer's representative may have greater privileges than a service technician for a particular ADC device on the ADC device platform.

For ADC device platforms 100 without a TCP/IP stack loaded (e.g., a platform using the 900 MHz protocol), the remote network controller 110 serves as an SNMP proxy. A proxy is a software construct that relays data between applications. The remote network controller 110 receives the SNMP commands and sends them to the ADC device platform 100 using the 900 MHz protocol and an appropriate reader command language.

The SNMP system management support unit 210 also provides support for the Trivial File Transfer Protocol ("TFTP"), application installation, and FLASH memory upgrades. Thus, using the system management support unit 210, a remote service technician could add a new SNMP subagent to the computing system 103 or perform an update on an existing SNMP subagent, such as the SNMP subagent 211. The system management support unit 210 communicates with the remote computing system 120 using sockets, TCP, UDP, and UDP+. Sockets provide an identifier for a particular service on a particular node of a network. The socket consists of a node address and a port number that identifies the service. TCP governs the break up of data messages into packets to be sent via the Internet Protocol ("IP") and the reassembly and verification of the complete messages from packets received. UDP is a connectionless protocol parallel to TCP in the IP communication stack. UDP converts data messages generated by an application into packets to be sent via IP but does not verify that the messages have been delivered correctly. Therefore, UDP is more efficient than TCP, although the reliability of UDP depends on the application generating the message. UDP+ provides additional functionality that is not provided by UDP, such as guaranteed packet delivery and packet ordering.

The system management unit 210 also provides upgrades to unit management HTML, DHTML, and/or XML pages 231. The unit management HTML, DHTML, and/or XML pages 231 may be accessed by an ADC platform HTTP server 230. HTML, or the Hypertext Markup Language, is a client/server protocol that provides documents for use on the World Wide Web. HTML uses tags to mark elements, such as text and graphics, in a document to indicate how web browsers should display the elements to the user and to indicate how the web browser should respond to user actions, such as an activation of a link by means of a key press or mouse click. The unit management HTML, DHTML, and/or XML pages 231 also contain Java applets for controlling different elements within the ADC platform device 100. DHTML provides the same capabilities as HTML but adds a capability for a Dynamic User Interface without requiring the web browser to query the HTTP server computer. XML provides a data standard that can encode the content, semantics, and schemata for a gamut of cases, from simple to complex. XML can encode the representation for an ordinary document; a structured record, such as an appointment record or purchase order; an object, with its data and methods such as the persistent form of a Java object or an ActiveX™ control; a data record, such as the result set of a query; metacontent about a World Wide Web site, such as Channel Definition Format ("CDF") information; graphical presentations such as an application's user interface, and standard schema entities and types. In essence, XML may be used for encoding all the links between information and people, such as remote service technicians, on the World Wide Web.

Using the unit management HTML, DHTML, and/or XML pages 231, the ADC platform HTTP server 230 provides information and applets, or small application programs, to the remote computing system 120, allowing a remote service technician to control the ADC device platform 100 and to receive data from an ADC device, such as the ADC device 102. The HTML, DHTML, and/or XML pages 231 located on the ADC platform device 100 reference unit management Java applets. Referencing a Java applet in an HTML page provides the mechanism for addressing that applet.

Figure 3:
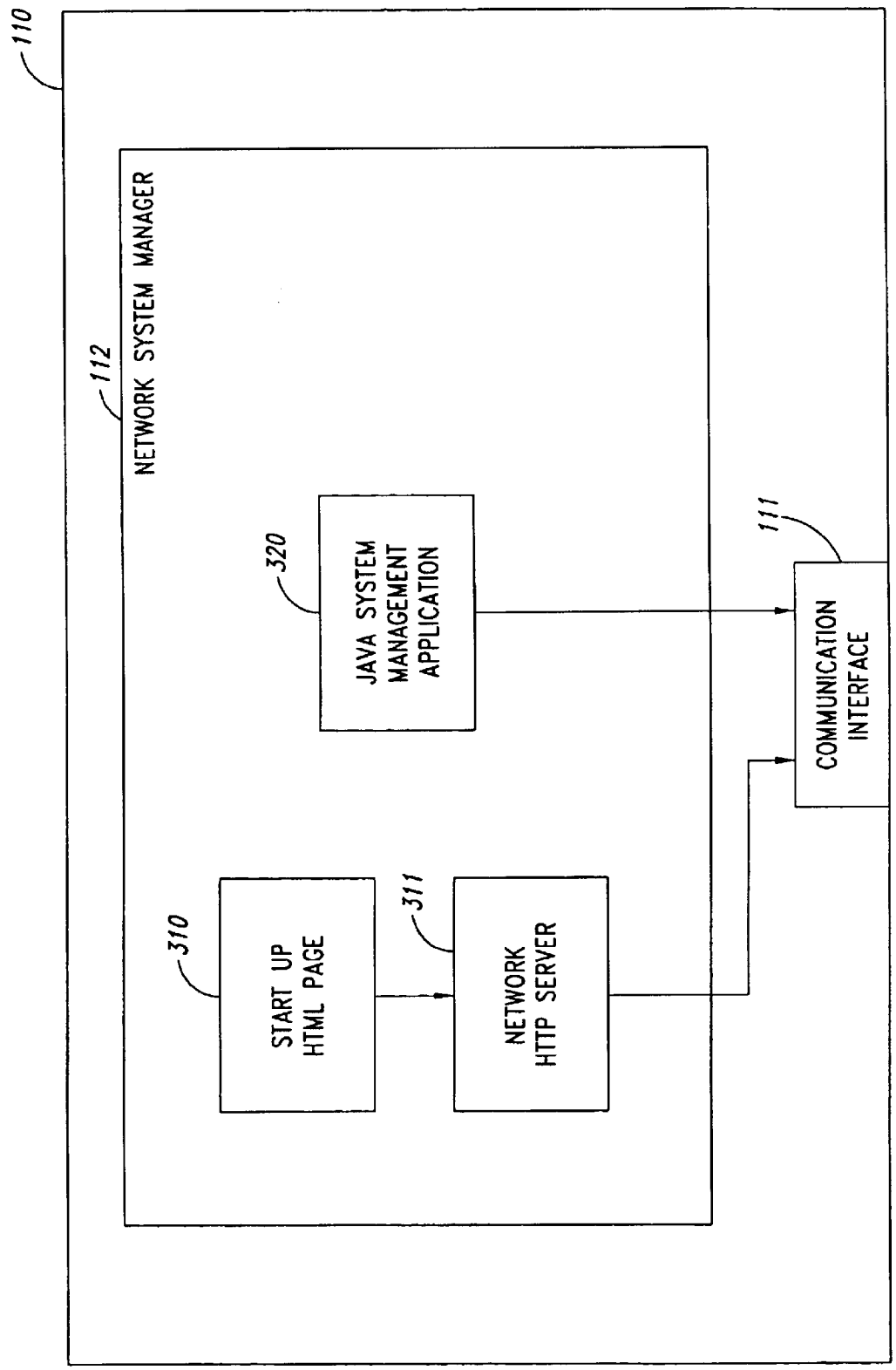
FIG. 3 provides more detail of a system manager in a network controller shown in FIG. 1.

FIG. 3 provides more detail of the network system manager 112 in the network controller 110. The system manager 112 includes a start up HTML page 310 that provides data to a network HTTP server 311. The start up HTML page 310 loads the initial system management information and related Java applets for transmission to the remote computing system 120. The network system manager 112 also includes a Java system management application 320 that communicates with the SNMP master agent 220 on the ADC device platform 100. The Java system management application 320 also communicates with the remote computing system 120. Java applets provided by the network system management 112 may be used for controlling various characteristics on one or more ADC device platforms 100.

A service technician using the remote computing system 120 may need to utilize information from the network system manager 112. For example, if the remote service technician is a service technician from a value-added reseller ("VAR"), the remote service technician may not have access to all of the necessary ADC device platform system management information. In other instances, the remote service technician may be aware that the customer has modified the system management information in a manner different from that provided by the manufacturer. Thus, even a service technician from the ADC device platform manufacturer might need to retrieve information from the network system manager 112 before performing diagnostic analysis on the ADC device platform 100.

Figure 4:
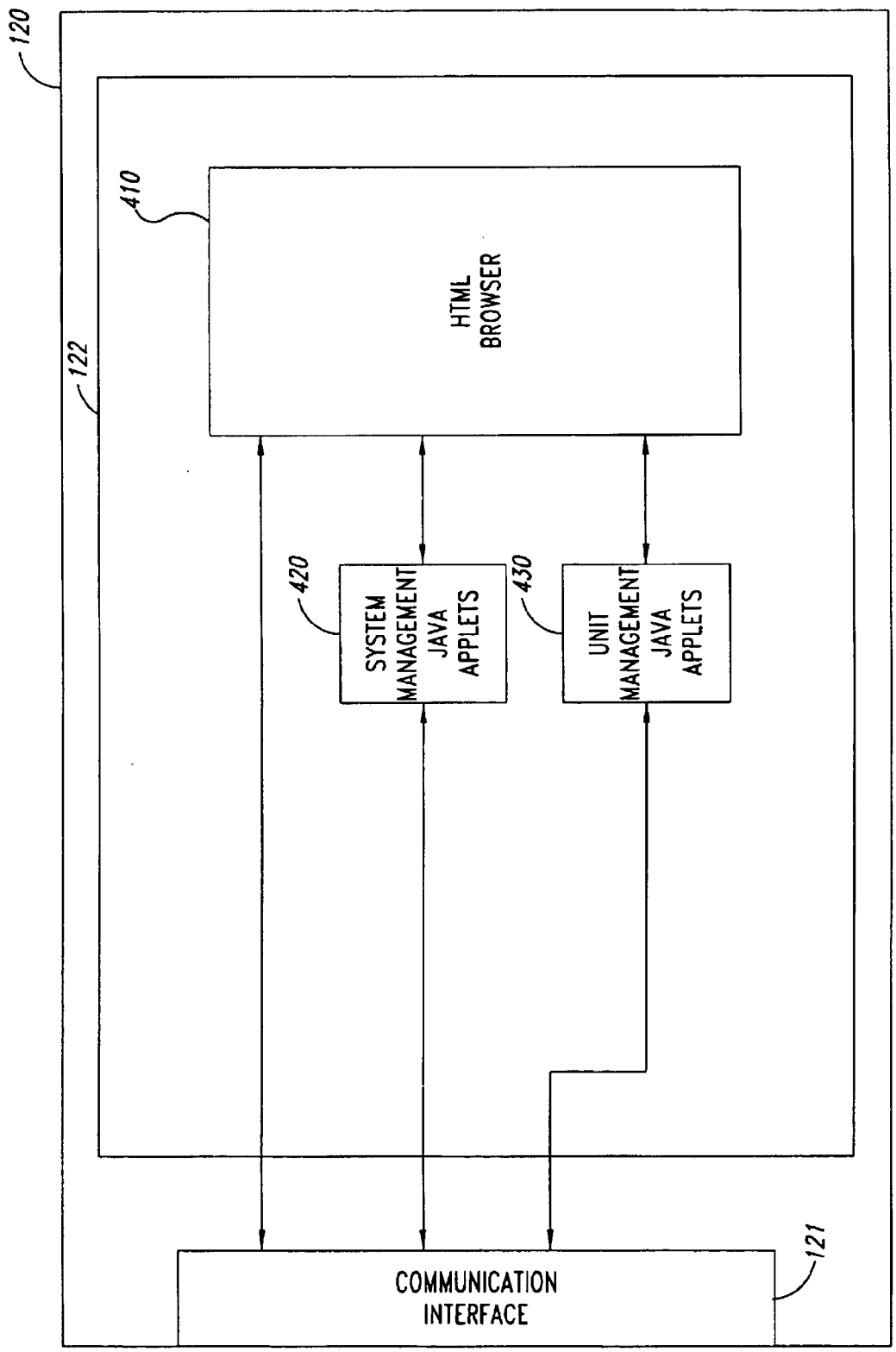
FIG. 4 provides more detail of an ADC console shown in FIG. 1.

FIG. 4 provides more detail on the ADC console 122 in the remote computing system 120. The remote service technician may access the ADC device platform 100 using the remote computing system 120. The ADC console 122 includes a remote HTML browser 410, system management Java applets 420 and unit management Java applets 430. The remote HTML browser 410 runs on any remote ADC console 122 such as a Windows95-equipped personal computer ("PC"), a UNIX workstation, an IBM host computer, or a WindowsCE equipped hand-held computer. The remote HTML browser 410 hosts the Java applets that provide the system management user interface and device communications. For example, the remote HTML browser 410 may receive ADC device platform configuration data from the network HTTP server 311. The system management Java applets 420 receive information from the Java system management application 320 through Java RMI sockets and CORBA. Java RMI, or Java Remote Method Invocation, is a Java-based communication mechanism that permits invocation of methods from remote Java objects. CORBA, or the Common Object Request Broker Architecture, allows pieces of programs ("objects") to communicate with other objects in other programs, even if the two programs have been written in different programming languages and run on different computing platforms. In CORBA, a program makes its request for objects through an object request broker ("ORB") and does not need to know the structure of the program from which the object comes.

The system management Java applets 420 enable remote diagnostic examination and reconfiguration on the ADC device platform 100. The unit management Java applets 430 may communicate with the Java system management application 320, the system management support unit 210, the SNMP master agent 220 and other elements of the ADC device platform 100. The unit management Java applets 430 are unit specific in scope and enable remote diagnostic evaluation and reconfiguration. Various system management Java applets 420 and unit management Java applets 430 may be loaded into the remote computing system 120 from the network HTTP server 311 and the ADC platform HTTP server 230, respectively. Unit management Java applets may also be loaded into the remote computing system 120 from a diagnostic server, such as that shown in FIG. 6.

For example, a system management Java applet 420 communicating through Java RMI to the Java system management application 320 may display the summary status of many ADC device platforms 100 to the remote service technician. The Java system management application 320 uses SNMP to collect summary information that is sent to the system management Java applet 420 for display. When the remote service technician needs to perform diagnostic analysis on an individual ADC device platform 100, the remote service technician may retrieve a diagnostic applet from the ADC device platform's HTTP server 230. The ADC device platform's HTTP server 230 sends a unit management Java applet 430 to the browser 410 in the form of a unit management HTML, DHTML, and/or XML page 231. The remote computing system may also receive the unit management Java applet 430 from a diagnostic server, such as the diagnostic server shown in FIG. 6. The unit management Java applet 430 communicates to an ADC device platform SNMP master agent 220 to perform system management functions, such as diagnostic analysis and device reconfiguration. The ADC device platform's SNMP master agent 220 uses system management support utilities to perform diagnostic analysis on a specified subsystem. The system management support utilities communicate to the unit management Java applet 430 through a socket layer, TCP/IP, and UDP/IP.

Figure 5:
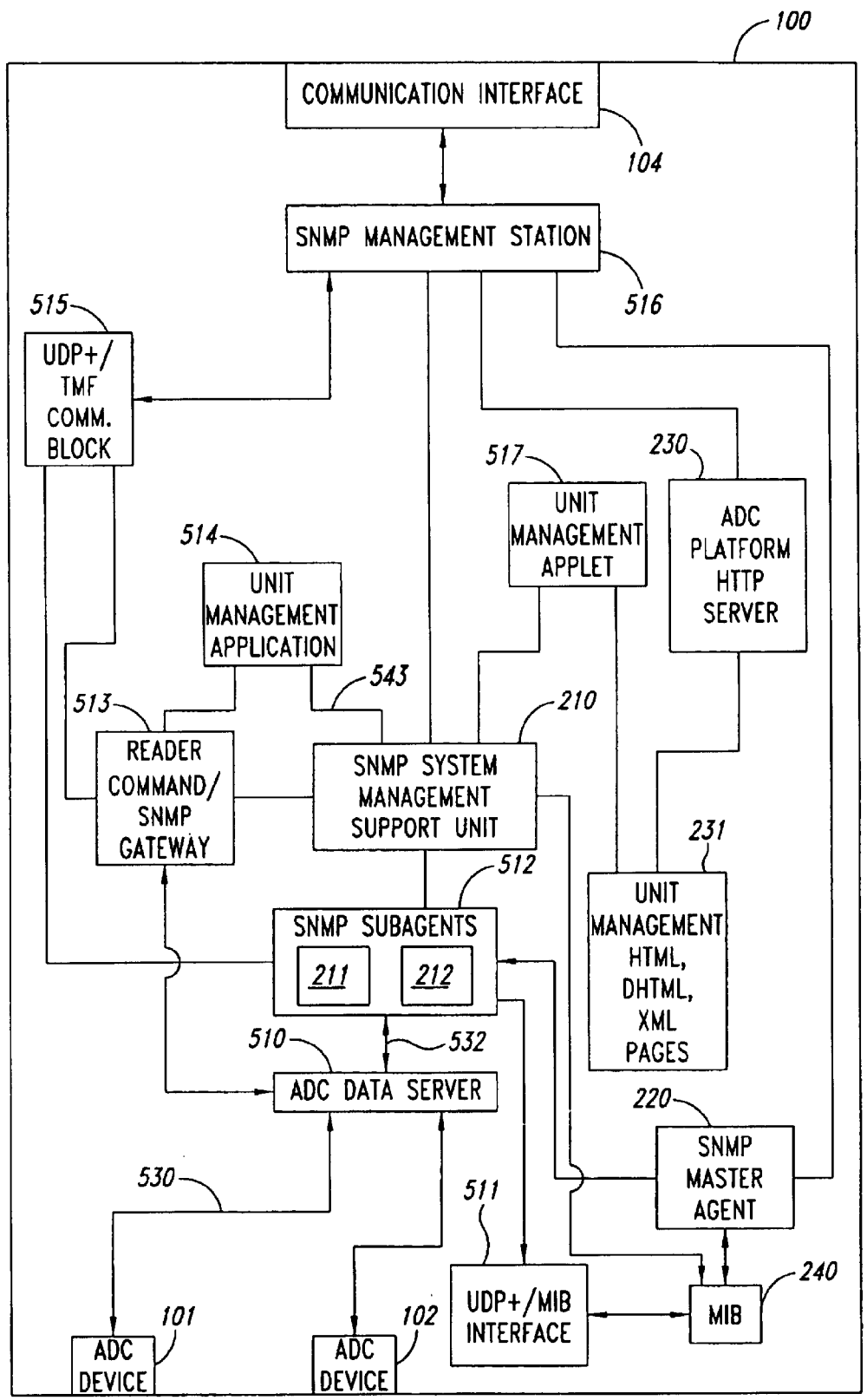
FIG. 5 illustrates the ADC device platform system management architecture for an exemplary embodiment of the invention.

FIG. 5 illustrates an ADC device platform system management architecture suitable for use with the invention. The SNMP master agent 220 communicates with the collective group of SNMP subagents 512. As previously discussed, two of the SNMP subagents are the SNMP subagent 211 for interfacing with the ADC device 101 and the SNMP subagent 212 for interfacing with the ADC device 102. The SNMP subagents 211 and 212 communicate with the ADC devices 101 and 102 through an ADC data server 510. Other SNMP subagents in the collection of SNMP subagents 512 may also communicate to an MIB interface using TCP and UDP/IP, as shown by a communication block 511.

New SNMP subagents and upgrades to existing SNMP subagents sent from the remote service technician arrive through the SNMP system management support unit 210. The SNMP system management support unit 210 provides a DLL or COM interface for the SNMP subagents 512. A DLL, or Dynamic-Link Library interface, and a COM, or Component Object Model interface, both allow executable routines to be stored separately as files having DLL extensions that are loaded only when needed by a program, such as by a SNMP subagent. A DLL/COM routine consumes no memory until it is used. Because a DLL/COM routine is a separate file, a programmer may make connections or improvements to the routine without effecting the operation of the calling program or any other DLL/COM routine. In addition, a programmer may use the same DLL/COM routine with other programs. The ADC device platform 100 may include DLL/COM objects for the various ADC symbologies, such as RF tag symbologies and bar code symbologies, that may be recognized by the ADC device readers 101 and 102. As described above, the ADC device platform 100 may be equipped with a wide variety of ADC device types.

The SNMP master agent 220 resides on the ADC device platform 100 and routes all SNMP requests to SNMP subagents 512. This architecture provides flexibility to the ADC device platform 100 by allowing the remote service technician to reconfigure or add new SNMP subagents 512 without effecting the other SNMP subagents or the MIBs in the MIB 240. The SNMP subagents 512 extend the standard SNMP MIB and handle SNMP requests for a list of OIDs representing a particular functional area. SNMP uses an OID, or object identifier, to address specific "Set" and "Get" functions. An SNMP reader subagent, such as the SNMP subagent 211, configures and monitors reader functions, such as the ADC device 101. A system management SNMP subagent performs firmware upgrades, diagnostic data transfers and installation of reconfigured subagents.

The system management support unit 210 communicates with a SNMP management station 516 using the Trivial File Transfer Protocol ("TFTP"). TFTP provides a minimal implementation of the File Transfer Protocol ("FTP"). Both FTP and TFTP are well-known protocols for copying files between hosts. The system management station 516 implements SNMP or other protocols to interface with the communications device 104. The system management station 516 runs an SNMP management package such as HP Open View.

The SNMP subagents 512 also communicate through a UDP+/TMF protocol communications block 515 and through a UDP+/MIB interface 511. The communications block 515 then uses the UDP+/TMF protocol to communicate with the SNMP management station 516. The Terminal Message Format protocol ("TMF") may function alternatively with the UDP+ protocol. TMF is a protocol layered on top of UDP+ for 2.4 GHz systems and on top of 900 MHz drivers for 900 MHz systems. The ADC device platform 100 includes device drivers that interface with the 900 MHz radio frequency drivers and TMF. TMF routes commands and data to the appropriate service or application and performs system management in 900 MHz systems and in legacy UDP+ systems. An SNMP subagent configures and monitors UDP+. The TCP, UDP/IP, and UDP+ communication stacks 515 and 511 are communication protocol stacks managed through the SNMP architecture. The protocol stacks also provide a MIB-II interface, an extension to the standard MIB.

The SNMP management support unit 210 communicates with a Reader Command/SNMP gateway 513. The Reader Command/SNMP gateway 513 routes ADC commands from the SNMP management support unit 210, allowing SNMP elements to be used for 900 MHz, UDP+, and bar code systems, as well as UDP/IP networks. The Reader Command/SNMP gateway 513 controls parsing/formatting and routing reader commands. The Reader Command SNMP gateway 513 controls ADC devices, such as the ADC device 101, by sending commands for operations, such as turning laser scans on and off, changing reader configuration, and performing system management operations like backup and restore. Reader commands may be received from bar code devices, 900 MHz devices, and local or remote clients. The Reader Command/SNMP gateway 513 parses these commands, translates them to an OID and routes them through the SNMP management support unit 210. The SNMP management support unit 210 then dispatches these requests to the appropriate SNMP subagents for processing. If a client requests configuration data in reader command format, then the Reader Command/SNMP gateway 513 packages the configuration data for the reader command format. This architecture intentionally isolates all legacy reader command processing in a single place, simplifying maintenance of the ADC device platform 100.

Using the Reader Command/SNMP gateway 513, the SNMP management support unit 210 may transfer legacy system management commands through the Reader Command/SNMP command gateway 513 to a unit management application 514. The unit management application 514 receives legacy reader command application programming interfaces ("APIs"). The SNMP management support unit 210 provides an SNMP interface to the Reader Command/SNMP gateway 513, which in turn provides a DLL interface to the unit management application 514. The Reader Command/SNMP gateway 513 may also communicate through the UDP+/TMF communication block 515 to reach the SNMP management station 516.

The ADC data server 510 provides device handlers for configuring ADC devices, such as the ADC devices 101 and 102. The ADC data server 510 may communicate with the Reader Command/SNMP gateway 513 to provide reader commands for the ADC devices. The ADC data server 510 provides reader command processing and configuration management. The ADC data server 510 notifies reader devices, such as reader devices 101 and 102, when their configuration has changed to support on-the-fly configuration changes. The ADC data server 510 supports an SNMP ADC group MIB in cooperation with the ADC devices, such as the ADC devices 101 and 102. A Reader Group MIB provides ADC device configuration, reporting ADC device statistics and running end device diagnostics. MIB subgroups support the Reader Group MIB for each end device and for the ADC data server itself.

As previously discussed, the HTTP server 230 runs on the ADC device platform 100 and may serve up the system management Java applets to the remote HTML browser 410. The HTTP server 230 may read HTML, DHTML, and/or XML pages from the HTML, DHTML, and/or XML page unit 231. These HTML, DHTML, and/or XML pages serve up the Java applets that the HTTP server 230 then transfers through the SNMP management station 516 to the remote browser 410.

A unit management applet 517 provides the user interface for the ADC device platform 100. The unit management applet 517 uses Java or a Win32 CPL applet as its user interface. The unit management applet 517 uses Win 32 CPL for local execution only and may use Java for both local and remote execution. Win32 is the application programming interface in Windows 95 and Windows NT that enables applications to use the 32-bit instructions available on 8386 and higher processors. The Win32 CPL applet is an applet for the control panel folder.

The unit management applet 517 communicates with the HTML, DHTML, and/or XML pages 231 and may provide new HTML, DHTML, and/or XML pages or updates to HTML, DHTML, and/or XML pages or new Java applets for the HTML, DHTML, and/or XML pages 231. The unit management applet 517 communicates to the SNMP master agent 220 using an SNMP interface. The SNMP master agent 220 may transfer system management commands to the unit management applet 517. A unit management Java applet 430 and unit management application 514 provide the user interface for local and remote access. When accessed remotely, this applet is served up through the HTTP protocol in the manner previously discussed. When it is accessed locally, this applet operates as an application.

The SNMP management support unit 210 may also communicate with the unit management application 514 through a SNMP interface 543. The SNMP management support unit 210 may transfer system management commands to the unit management application 514. The SNMP management support unit 210 communicates with the SNMP management station 516 using the SNMP protocol.

As previously discussed, the unit management applet 517 provides local access to the system management functions of the ADC device platform 100. Thus, backup/restore, firmware upgrade, application installation and other functions may be provided using the same unit management Java applets used for remote access by the remote computing system 120. For UDP+ and for legacy system management applications, the terminal management format ("TMF") protocol and the Reader Command/SNMP gateway 513 route configuration and system management requests to the SNMP master agent 220.

Figure 6:
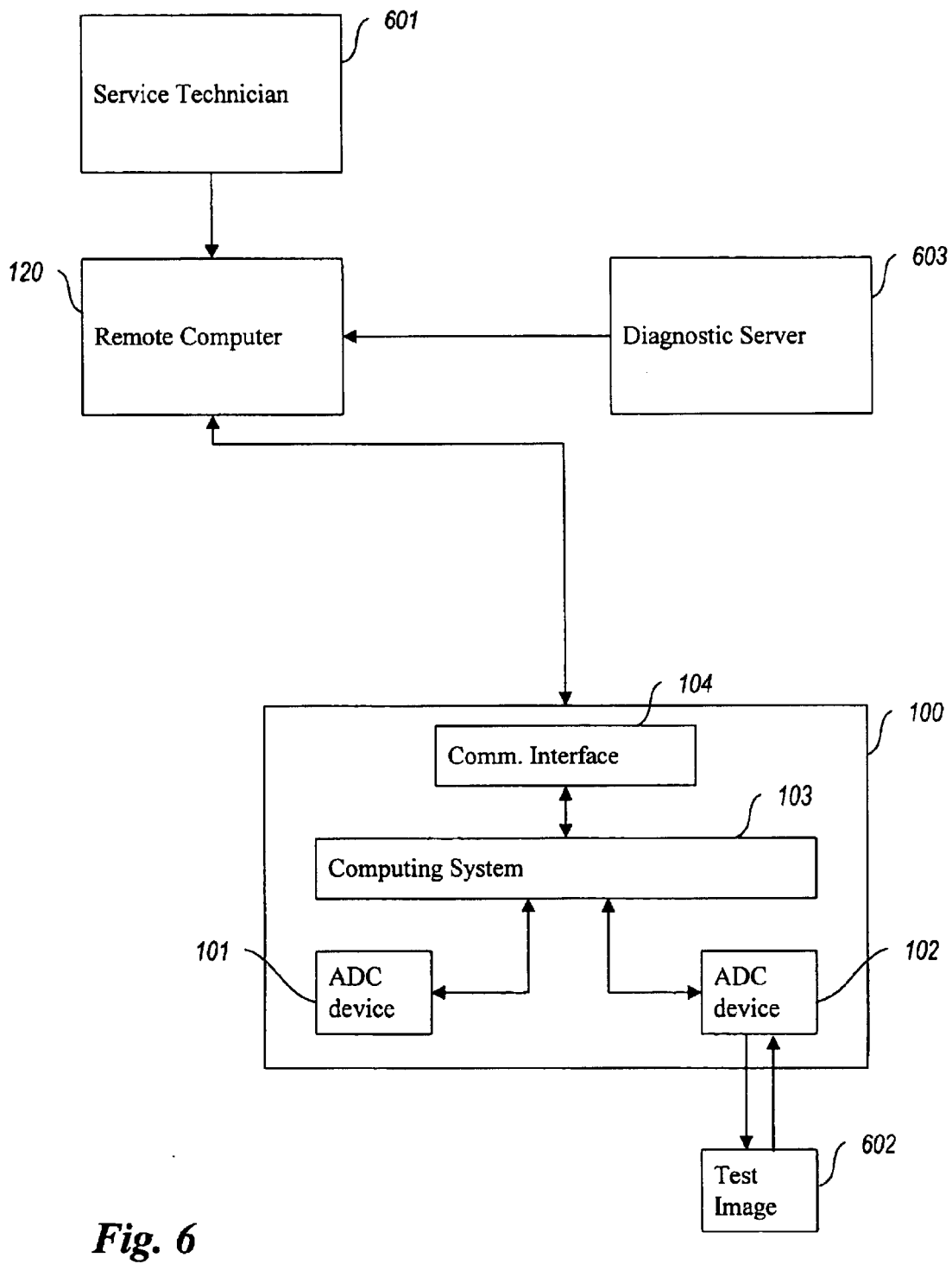
FIG. 6 illustrates a system for remotely diagnosing anomalies in the ADC device platforms, according to an embodiment of the invention.

FIG. 6 illustrates a system for remotely diagnosing anomalies in ADC device platforms 100, according to an embodiment of the invention. The ADC device platform 100 communicates with the remote computer 120 operated by a remote service technician 601. Upon notification of an anomaly in the ADC device platform 100, the remote service technician 601 uses the remote computer 120 to perform a diagnostic examination of the ADC device platform 100. The remote service technician 601 may have been alerted to the anomaly within the ADC device platform 100 by the device operator or may have received an indication of the apparent malfunction in the ADC device platform 100 automatically generated from an anomaly reporting unit within the ADC device platform 100 itself. Using diagnostic tools available through the remote computing system 120, the remote service technician 601 may query the ADC device platform 100 for particular operating characteristics. The data retrieved from these diagnostic queries may aid the remote service technician 601 in determining a proper anomaly diagnosis for the ADC device platform's malfunctioning elements.

Unit management Java applets 430 may be loaded into the remote computing system 120 from a diagnostic server 603. The diagnostic server 603 may send a unit management Java applet 430 to the browser 410 in the form of a unit management HTML document, DHTML document, and/or XML document. The unit management Java applet 430 communicates with the SNMP master agent 220 to perform diagnostic analysis. The ADC device platform SNMP master agent 220 uses the system management support unit 210 to perform diagnostic analysis on a specified subsystem. The system management support utilities communicate to the unit management Java applet 430 through a socket layer, TCP/IP, and UDP/IP. Unit management Java applets 430 for diagnostic purposes may also be served up by the ADC platform HTTP server 230 in the manner previously discussed.

Once the remote service technician 601 has determined which elements of the ADC device platform 100 appear to be malfunctioning, then the remote service technician 601 determines whether repairs may be made over the communications network, e.g., rebooting a system element or reinstalling a MIB or SNMP subagent for a malfunctioning element. The remote service technician 601 may also determine that the anomaly requires the return of the ADC device platform 100 to the manufacturer or that a service call should be performed by a trained technician. The remote service technician 601 may also conclude that repair to the ADC device platform 100 could be accomplished by a physical adjustment within the technical ability of the on-site device operator, e.g., a simple mechanical adjustment. In some instances the simple mechanical adjustment may be conducted in conjunction with a restoration operation performed by the remote service technician 601 over the telecommunications network, e.g., reconfiguring a particular MIB.

The ADC device platform 100 may include a test kit containing one or more test images 602 appropriate for a particular ADC device, such as the ADC device 102. Should the device operator experience difficulty using the ADC device 102, for example, the remote service technician 601 may instruct the device operator to position the test image 602 so that the service technician 601 may remotely scan or image the test image 602. The service technician 601 may direct raw device data to be returned directly to the remote computer 120 without any processing on the ADC device platform 100. A successful scan or image of the test image 602 may indicate to the remote service technician 601 that either the anomaly has been corrected or that an alternative diagnosis is appropriate, e.g., the device operator has not enabled a particular bar code symbology on the ADC device 102 on the ADC device platform 100. The remote service technician 601 may also use data from the scanning or imaging of the test image 602 to diagnose specific anomalies. For example, since the remote service technician 601 knows the correct data associated with the test image 602, then the remote service technician may diagnose anomalies by comparing the data retrieved by the ADC device 102 in scanning or imaging the test image 602 against the test image 602. The remote service technician 601 knows what the test image 602 looks like because the test image 602 has been provided by the manufacturer, for example.

Using the system shown in FIG. 6, the remote service technician 601 may correct all anomalies except for those requiring major physical modifications to the ADC device platform 100. As noted above, with the cooperation of the device operator, minor physical modifications the ADC device platform 100 may be corrected without having to return the ADC device platform 100 to its manufacturer.

In order for the remote service technician 601 to initiate a diagnostic analysis, the remote service technician 601 must first be alerted to an anomaly in a specific ADC device platform 100. The remote service technician 601 may be alerted to an anomaly condition in the ADC device platform 100 through any form of communications media. For example, the remote service technician 601 may receive an electronic mail message ("e-mail"), either from the device operator or from the ADC device platform 100 itself. The remote service technician 601 may also receive notice of an anomaly via a telephone call or a facsimile message.

Figure 7:
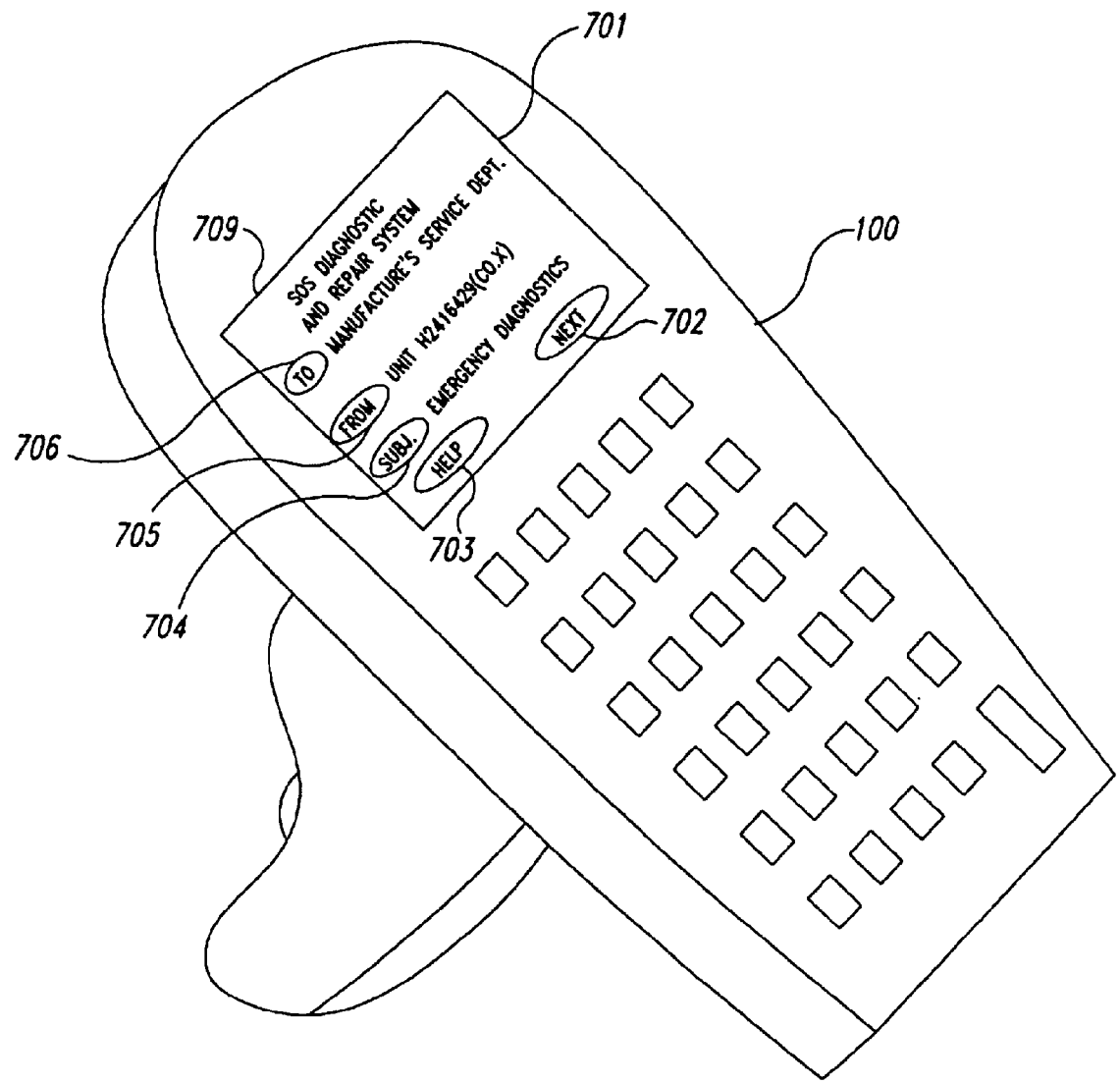
FIG. 7 illustrates a diagnostic and repair electronic mail ("e-mail") message being prepared from an ADC device platform having a malfunctioning subsystem.

FIG. 7 illustrates a diagnostic and repair e-mail message 701 being prepared at a malfunctioning ADC device platform 100. The ADC device platform 100 displays the diagnostic and repair e-mail message 701 on an ADC device platform graphics screen 709. The diagnostic and repair e-mail message 701 may include previously stored information. For example, the diagnostic and repair e-mail message 701 may already be addressed to an appropriate ADC servicing agent, such as the remote technician 601, and may include the ADC device platform 100's unit and model numbers.

The ADC device platform 100 includes a number of individual elements. The device operator may be aware that a particular element is malfunctioning, such as the ADC device 101. The ADC device 101 may have been provided by a third party vendor. Thus, if the device operator believes that the anomaly is in the ADC device 101 and not with the ADC device platform 100 itself, then the device operator may wish to send the diagnostic and repair e-mail message 701 to the service department of the ADC device's manufacturer rather than to the service department of ADC device platform's manufacturer. Using a "To" button 706, the device operator scans through a list of previously stored e-mail addresses associated with the service departments of the ADC device platform's various elements.

In some circumstances, the device operator may wish to enter a number other than the ADC device platform's unit number, such as an element's part number. Using a "From" button 705, the device operator scans through a list of element part numbers. For example, the device operator may use the "To" button 706 to select the e-mail address for the service department for the manufacturer of the ADC device 101 and may use the "From" button 705 to indicate the element number of the ADC device 101. Similarly, the device operator may use a "Subject" button 704 to select an additional topic information for the diagnostic and repair email message 701.

If the device operator does not find an appropriate e-mail address or needs to indicate information that has not previously been stored, then the device operator may use the ADC device 100's keyboard to enter pertinent information, e.g., an e-mail address. In addition, the device operator may access a "Help" button 703 to receive help in completing the diagnostic and repair e-mail message 701. When the device operator has completed the first page of the diagnostic and repair e-mail message 701, then the device operator may actuate a "Next" button 702 that allows the device operator to complete the remaining entries in the diagnostic and repair e-mail message 701. For ADC device platforms 100 having larger screens or smaller fonts, the "Next" button 702 may not be necessary because the entire diagnostic and repair e-mail message 701 fits on a single screen.

Figure 8A:
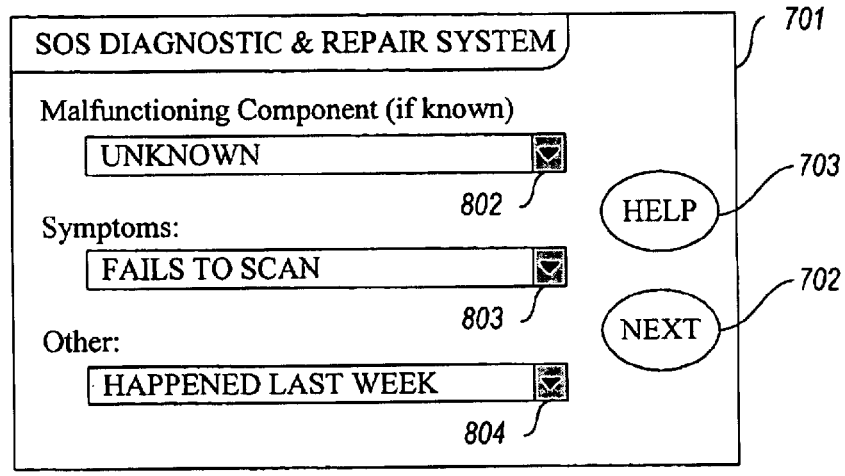
FIGS. 8A and 8B illustrate fields in an exemplary diagnostic and repair e-mail message.
Figure 8B:
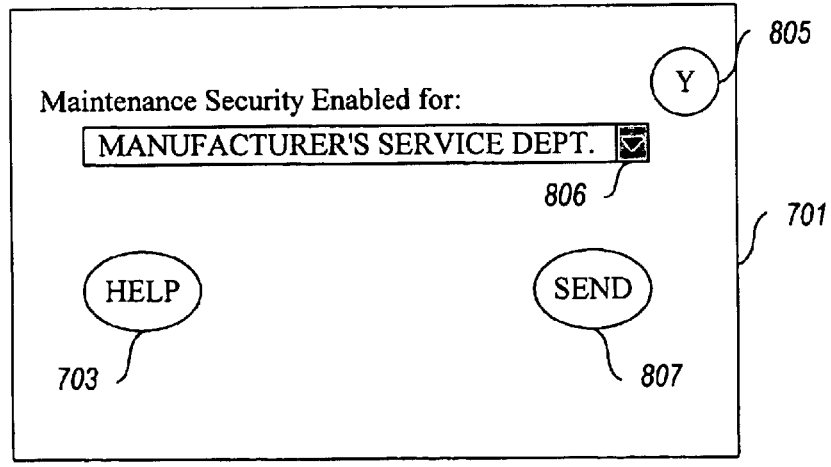

FIGS. 8A and 8B illustrate additional fields in an exemplary embodiment of the diagnostic and repair e-mail message 701. The device operator may utilize a "Malfunctioning Element" field 802 to indicate which element of the ADC device platform 100 appears to be malfunctioning. In this embodiment of the diagnostic and repair e-mail message 701, the device operator may simply select a candidate malfunctioning element from a number of prestored element entries using a pull down menu, including an "unknown" entry. The ADC device operator may also utilize a "Symptoms" field 803 to indicate how the anomaly has manifested itself In the exemplary diagnostic and repair e-mail message 701, the device operator may select from a number of prestored symptoms, including an "Unknown" field. Similarly, the device operator may also complete an "Other" field 804. The Other field 804 may be utilized by the device operator to provide additional information that may be helpful to the remote service technician 601. In this exemplary embodiment of the diagnostic and repair e-mail message 701, if the device operator needs to indicate a response other than the prestored selections, the device operator may use the keyboard of the ADC device platform 100 to enter the appropriate information into any of the fields 802–804.

Depending upon the particular device operator, the particular service agency, and the particular ADC device platform 100, the device operator may need to enable security features on the ADC device platform 100 in order to allow the remote service technician 601 to gain access to the ADC device platform 100. For example, the device operator may need to turn off certain log-on and password procedures or may provide the remote service technician 601 with user name and a password. In some instances, the device operator may simply enable a pre-arranged password for the remote service technician 601. As shown in FIG. 8B, a "Maintenance Security Enabled" field 805 has been enabled for the remote service technician 601. In the embodiment shown in FIG. 8B, enabling the Maintenance Security Enabled field 805 allows the remote service technician 601 to utilize a password that is otherwise disabled. For example, prior to the purchase of the ADC device 101 from an ADC reader manufacturer, the ADC reader manufacturer may install a password that allows the remote service technician 601 to gain access to the ADC device 101 through ADC device platform 100; however, this password may be disabled normally and remain disabled until deliberately enabled by the device operator.

Since the ADC device platform 100 may include a number of elements not provided by its original manufacturer, the device operator may indicate which element supplier has an enabled password in an "Element" field 806. In addition, the Element field 806 may also be utilized to store the e-mail address for a service technician for which the device operator has a maintenance contract. Thus, the ADC device platform 100 may be serviced by technicians other than those provided by the manufacturers of its constituent parts. When the diagnostic and repair e-mail message 701 has been completed, then the device operator may actuate a "Send" button 807 that causes the diagnostic and repair e-mail message 701 to be sent to the remote service technician 601.

The device operator may also use another computer, such as a PC, to compose diagnostic and repair e-mail message similar to the diagnostic and repair e-mail message 701. In some instances, the anomaly with the ADC device platform 100 may prevent the device operator from completing the diagnostic and repair e-mail message 701 from the ADC device platform 100. For example, the display screen itself may have lost functionality.

Figure 9:
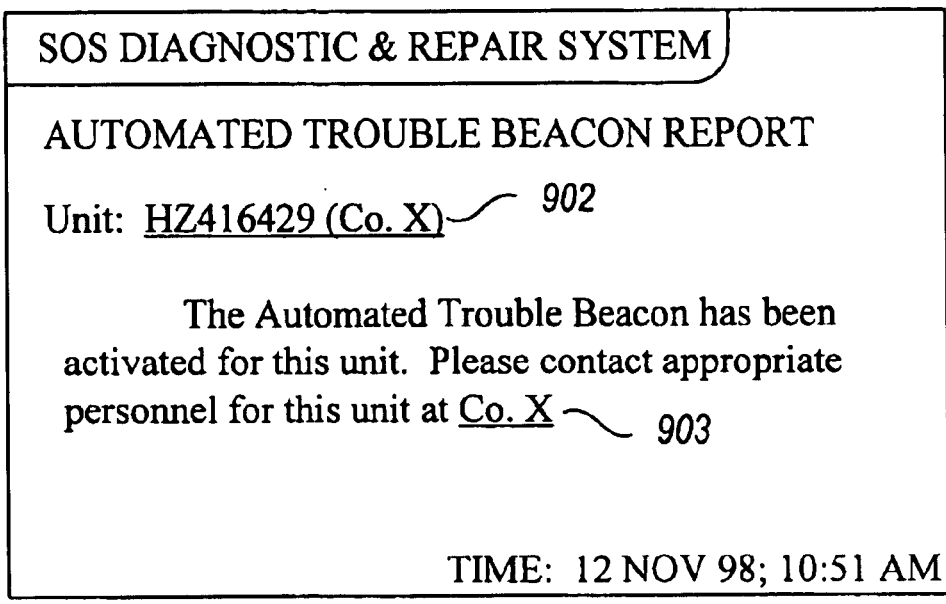
FIG. 9 shows a diagnostic and repair e-mail message associated with an automated anomaly reporting beacon in which all of the message fields have been predetermined.

FIG. 9 illustrates another embodiment of a diagnostic and repair e-mail message. In some embodiments, the ADC device platform 100 may not have the capability for producing a trouble reporting e-mail as comprehensive as the diagnostic and repair e-mail message 701 shown in FIGS. 7 and 8. FIG. 9 illustrates a simpler diagnostic and repair e-mail message 901 in which all of the fields have been predetermined prior to the e-mail's invocation. Because all of the e-mail's fields have previously been completed, the device operator only needs to send the diagnostic and repair e-mail message 901 to the remote service technician 601. For example, a unit identification number 902 has previously been stored in the ADC device platform 100 along with a contact address 903 for a contact person at the ADC device platform's location who may speak with the remote service technician 601. Thus, when the device operator actuates the diagnostic and repair e-mail message 901, then the remote service technician 601 will receive a preformatted message.

In summary the diagnostic and repair e-mail message 901 operates as an automated trouble beacon. The automated trouble beacon may be invoked by the device operator or by the ADC device platform 100 itself The automated trouble beacon may also be engaged either separately or in conjunction with the device operator composed diagnostic and repair e-mail message 701. In some embodiments of the invention, the automated trouble beacon may be invoked automatically by the ADC device platform 100 itself based on the occurrence of predetermined criteria, with no need for any specific action by the device operator.

Figure 10A:
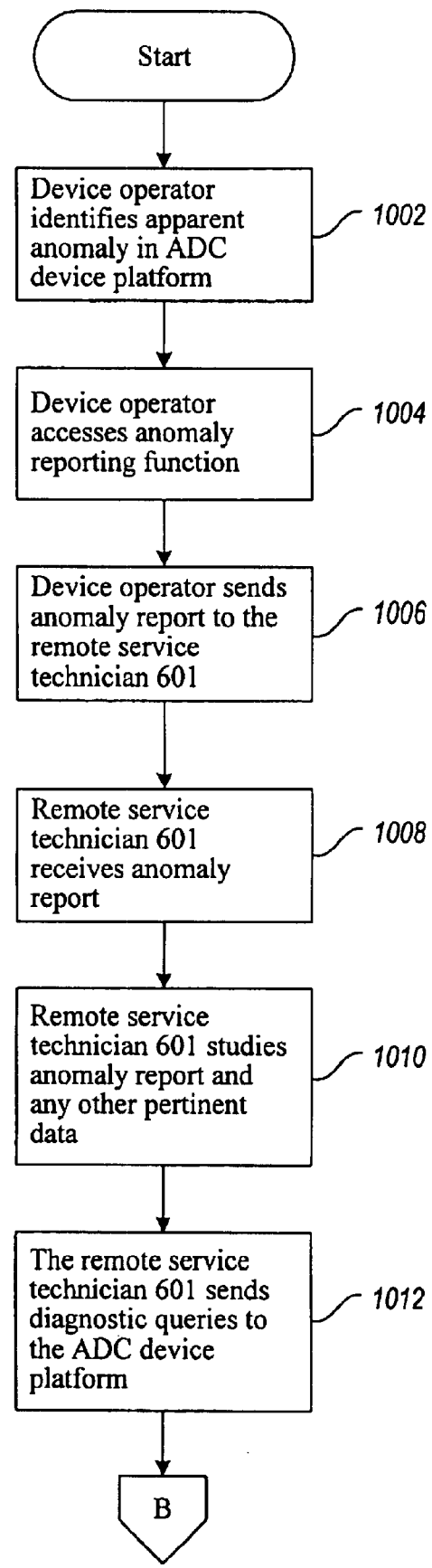
FIGS. 10A, B, and C provide a flowchart illustrating a process for making a remote service technician aware of an anomaly with the ADC device platform and the steps taken by the remote service technician to diagnose and correct anomalies in the ADC device platform.
Figure 10B:
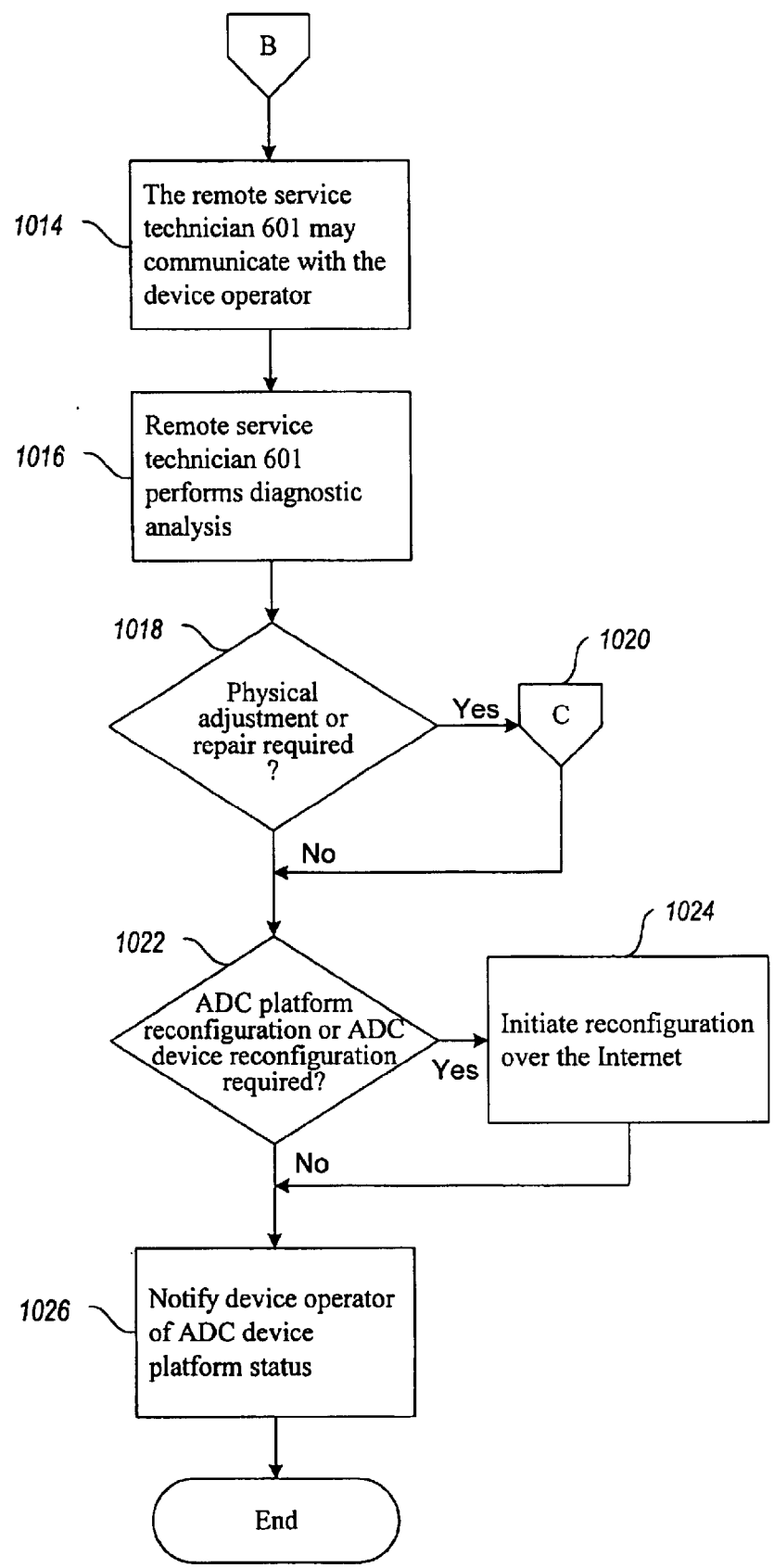

FIGS. 10A, B, and C provide a flowchart illustrating an exemplary procedure for making the remote service technician 601 aware of an anomaly with the ADC device platform 100 and the steps taken by the remote service technician 601 to diagnose and correct anomalies in the ADC device platform 100. The device operator identifies an apparent anomaly in the ADC device platform 100 ("step 1002"). The device operator then accesses an anomaly reporting function, such as the automatic reporting function described in FIGS. 7 and 8 ("step 1004"). The device operator may complete an anomaly reporting form, such as the diagnostic and repair e-mail message 701 shown in FIGS. 7 and 8, in order to report the anomaly to the remote service technician 601. The device operator then sends the internal anomaly report to the remote service technician 601 ("step 1006"). Depending upon the type of anomaly reporting system utilized, making the remote service technician 601 aware of an anomaly in the ADC device platform 100 may entail a communication via telephone, facsimile, or by electronic mail, as previously discussed.

The remote service technician 601 receives the anomaly report ("step 1008") and then studies the anomaly report along with any other pertinent information provided by the device operator ("step 1010"). The service technician 601 may send diagnostic queries to the ADC device platform 100 ("step 1012"). The service technician 601 may also communicate with the device operator, as needed ("step 1014"). The remote service technician 601 may query the ADC device platform 100, according to the following exemplary procedure. The remote service technician 601 selects an appropriate diagnostic procedure from the remote computer 120. The remote HTML browser 410 may extract a diagnostic Java applet containing the diagnostic procedure from an HTML page on the diagnostic server 603 and load the diagnostic procedure into itself The now active system diagnostic Java applet 430 sends a "Set" request for the diagnostic OID to the SNMP master agent 220. The SNMP master agent 220 then requests the system management support unit 210 to run the appropriate diagnostic. The system management support unit 210 runs the diagnostic and returns diagnostic data to the SNMP master agent 220. The SNMP master agent 220 then returns the OID values as a diagnostic status message to the unit management Java applet 430 which displays the diagnostic information to the service technician 601.

The remote service technician 601 then performs diagnostic analysis on the diagnostic information retrieved from the ADC device platform 100 using diagnostic analysis tools available on the remote computer 120 ("step 1016"). The diagnostic analysis tools may also be retrieved from the diagnostic server 603. The remote service technician 601 may perform multiple diagnostic queries on the ADC device platform 100 in order to arrive at a diagnosis of the reported malfunction.

Figure 10C:
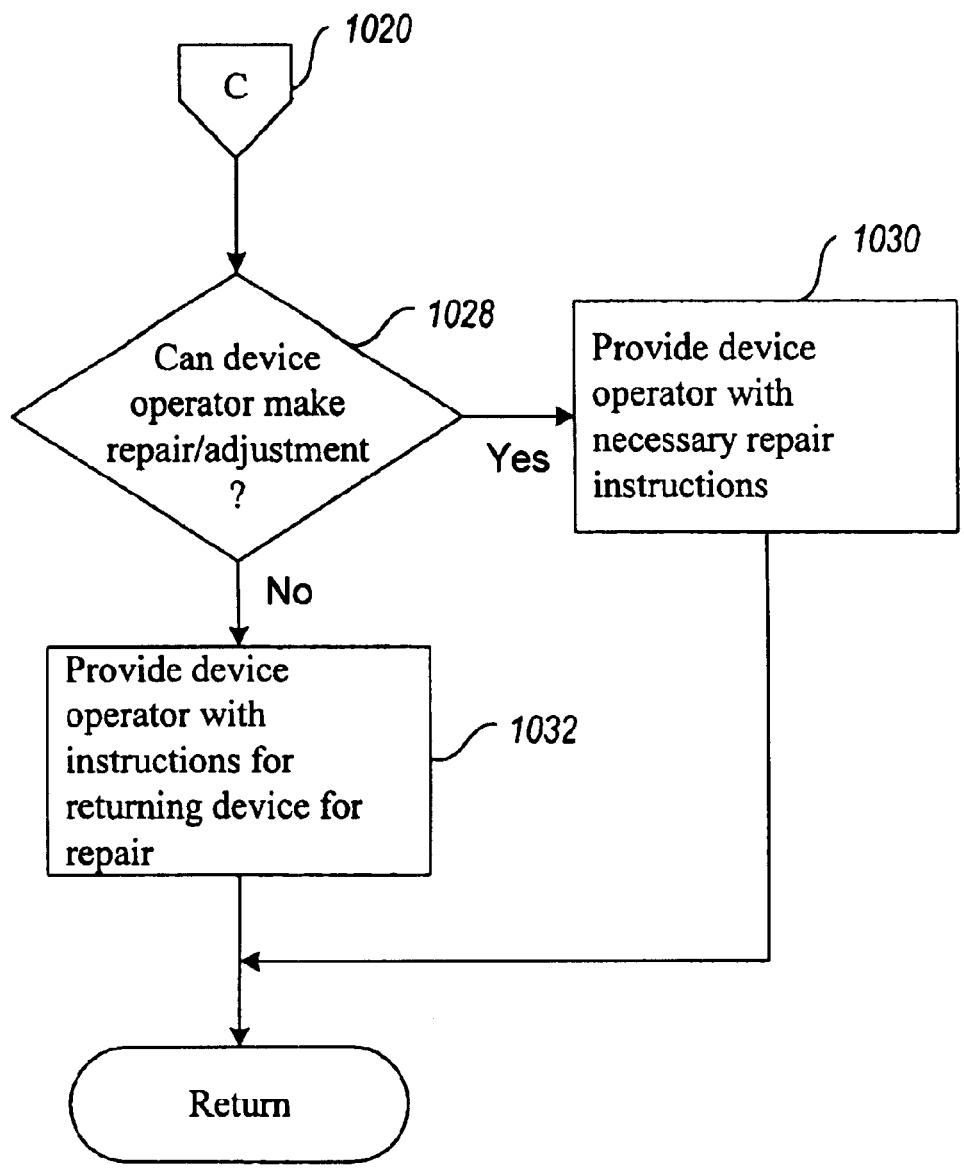

In some instances, the remote service technician 601 may determine ("step 1018") that a physical adjustment or repair is required in the ADC device platform 100 ("step 1020"). If physical adjustment or repair is required, then the steps shown in FIG. 10C are followed. The remote service technician 601 may also determine ("step 1022") that one or more elements of the ADC device platform 100 need to be reconfigured. If the device needs to be reconfigured, then the remote service technician 601 initiates reconfiguration over the Internet ("step 1024"). The remote service technician 601 then notifies the device operator of the ADC device platform status ("step 1026").

As a result of the remote service technician's diagnostic analysis, the remote service technician 601 may determine that software controlling the ADC device platform 100 needs to be reloaded or adjusted ("step 1024"). For example, the remote technician 601 may determine that one or more SNMP subagents needs to be reconfigured and forwards a list of these SNMP subagents to the unit management Java applet 430. The unit management Java applet 430 then invokes the proper functionality for completing the service technician's restoration procedure. As another example, the service technician's diagnostic analysis may indicate that the ADC device 101 needs to be reconfigured. The unit management Java applet 430 sends a "Set" request reconfiguring the OID to the SNMP master agent 220. The SNMP master agent 220 sends a "Set" reconfiguration request to the ADC data server 510. The ADC data server 510 then sends a subsystem reconfiguration request to the ADC device 101. The ADC device 101 sends a reconfiguration response to the ADC data server 510. The SNMP master agent 220 then receives a set reconfiguration response from the ADC data server 510. The SNMP master agent 220 forwards a return OID for the set reconfiguration response to the unit management Java applet 430 on the remote console 122. The unit management Java applet 430 then displays the requested reconfiguration values to the remote service technician 601.

FIG. 10C illustrates the procedure followed when the ADC device platform 100 or one or more of its elements requires a physical repair or adjustment. The remote service technician 601, with input from the device operator, determines whether the nature of the anomaly and its corresponding repair is within the abilities of the device operator ("step 1028"). For example, the remote service technician 601 may conclude based upon diagnostic data received from the ADC device platform 100 that repair by the device operator would be unwise because the recommended repair entails replacement of elements that would not be available to the device operator. On the other hand, if the device operator and the remote service technician believe that the device operator is capable of performing the recommended repairs, then the remote service technician 601 provides the device operator with the necessary repair instructions ("step 1030"). For example the remote service technician 601 may provide the device operator with instructions for adjusting a mounting screw associated with the ADC device 101. An exemplary embodiment of a repair procedure will be discussed with regard to FIG. 11. If the device operator will not complete the recommended repairs or adjustments, then the remote service technician 601 provides the device operator with instructions for returning the ADC device platform 100 to the manufacturer for repair or makes arrangements for a service call by a qualified service technician ("step 1032").

In diagnosing the reported malfunction, the remote service technician 601 may determine that the ADC device platform 100 actually contains no anomaly at all and that all its elements, including its software, are functioning properly. Such a condition may arise when the ADC device platform 100 has been set in a manner contrary to that which the device operator believes it has been set. The remote service technician 601 may thus determine that if certain device settings on the ADC device platform 100 were altered then the ADC device platform 100 would function in an expected manner. The remote service technician 601 may provide the device operator with an indication of which settings should be altered or the remote service technician 601 may alter the settings himself over the Internet. A complementary method and system for alleviating this type of anomalous situation is described in a patent application entitled "Automated Help Instructions for Automatically or Adaptively Configuring a Hand-held Device, such as a Bar Code Reader or Hand-held Personal Computer," U.S. application Ser. No. 09/072,948, filed on May 4, 1998 and assigned to a common assignee.

Figure 11:
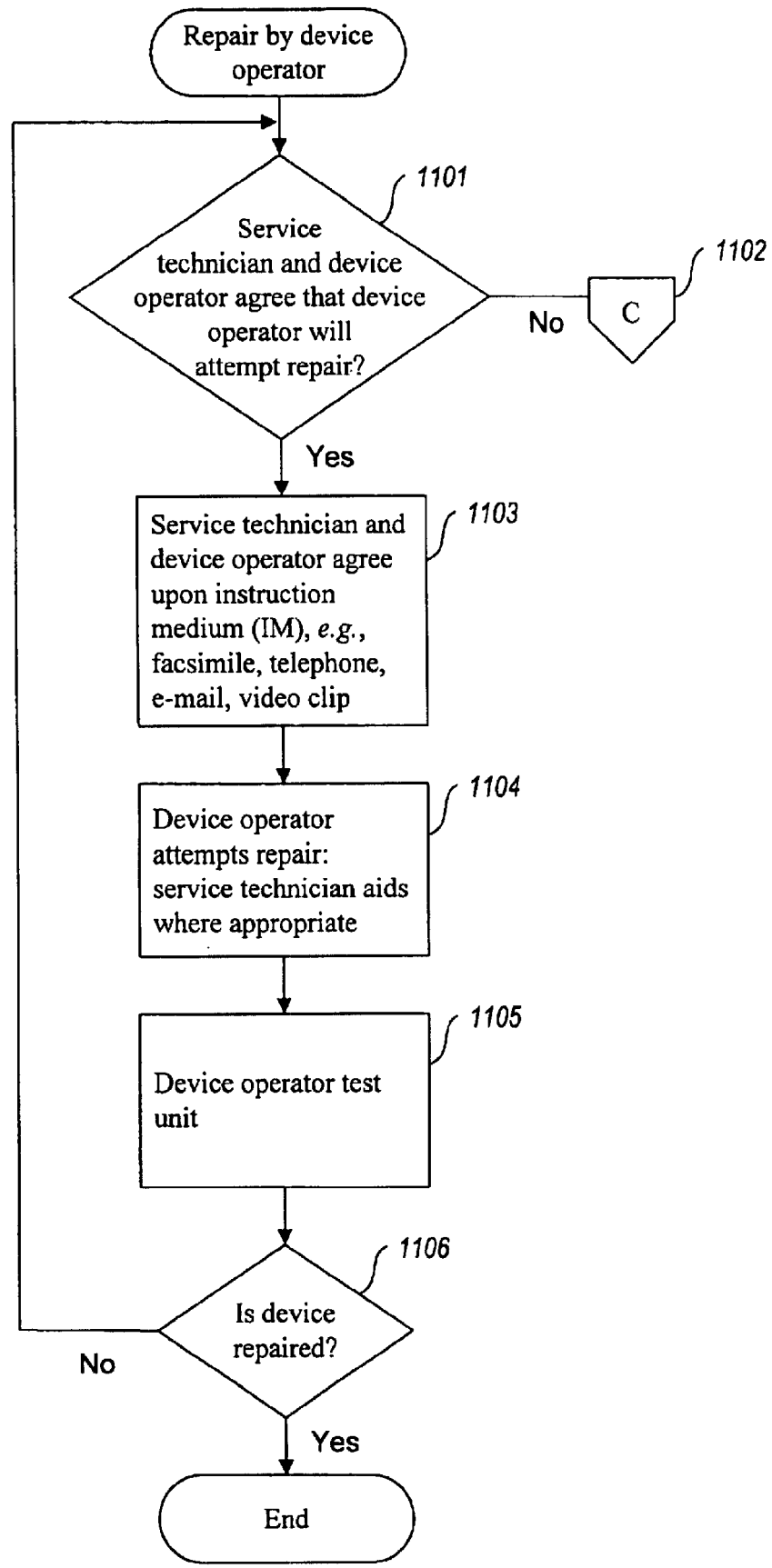
FIG. 11 illustrates a flowchart for repair of the ADC device platform by the device operator using instructions received from the remote service technician.

FIG. 11 provides an exemplary flowchart for repair of the ADC device platform 100 by the device operator under the direction of the remote service technician 601. As indicated in FIG. 10C, the device operator may be capable of making certain repairs to the ADC device platform 100. Should the remote service technician's diagnosis of the ADC device platform 100 indicate that a minor adjustment would repair the ADC device platform 100, then repair by the device operator may obviate the need to return the ADC device platform 100 to the manufacturer for repair. Of course, some device operators may decline to make any adjustments or repairs to the ADC device platform 100, no matter how simple.

If the remote service technician 601 and the device operator agree that the device operator will attempt repair ("step 1101"), then the remote service technician 601 and the device operator agree upon an instruction medium through which the service technician 601 may supply the device operator with the appropriate instructions for making the necessary repairs to the ADC device platform 100 ("step 1103"). The telephone or e-mail may be appropriate mediums for making repairs to the ADC device platform 100 for simple adjustments. For more complicated adjustments, the remote service technician 601 may need to supply the device operator with written instructions, drawings, and perhaps even a short video clip showing how the repair may be made. Written instructions and diagrams may be provided by facsimile or by e-mail. A short video clip may be downloaded to a computer, such as a PC, accessible by the device operator. The instructional video clip may be designed so that the device operator may slowly review each of the steps that need to be performed to make the repair.

The device operator then attempts the recommended repairs and may be aided in conducting these tasks by the remote service technician 601 ("step 1104"). Upon completion of the repairs, the device operator or the remote service technician 601 will then test the ADC device platform 100 ("step 1105"). If the ADC device platform is now functioning properly ("step 1106"), then the repair function terminates. If the ADC device platform 100 has not been repaired (step 1106"), then the remote service technician 601 and the device operator need to determine whether the device operator should attempt additional repairs ("step 1101"). Testing of the repaired ADC device platform 100 may also entail providing test data to the ADC device platform 100 by the remote service technician 601.

Figure 12:
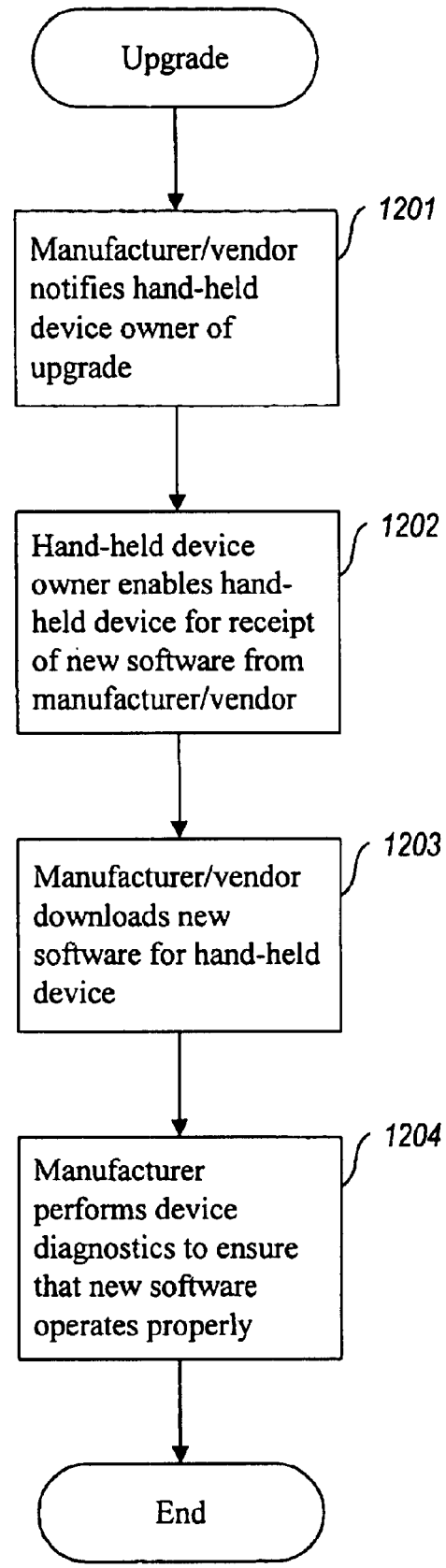
FIG. 12 provides a flowchart illustrating an ADC device software upgrade procedure that may be performed by the remote service technician on the ADC device platform.

Some purchasers of ADC device platforms 100 may also purchase service contracts from the manufacturer of the ADC device platform 100. In addition, some manufacturers may also provide periodic upgrades to the software that directs the operations of the ADC device platform 100 and its elements. FIG. 12 provides a flowchart illustrating an exemplary upgrade procedure that may be performed by a remote service technician 601.

The manufacturer or service vendor notifies the owner of the ADC device platform 100 that an upgrade to the device software is available ("step 1201"). For example, the vendor of the ADC device 101 may provide a new SNMP subagent 212 for the ADC device 101. As previously discussed, the ADC device platform 100 owner may not always configure the ADC device platform 100 such that the manufacturer or the vendor may gain access to the device through the Internet. However, the ADC device platform 100 may contain a password that, if enabled, would allow the manufacturer or vendor to gain access to the ADC device platform 100. Thus, the ADC device platform 100 owner enables the ADC device platform 100 to receive software from the manufacturer or vendor ("step 1202"). The manufacturer or vendor then downloads new software for the ADC device platform 100 ("step 1203"). Continuing with the example above, the remote service technician 601 selects the ADC device platform 100 to receive a replacement for the SNMP subagent 212. The unit management Java applet 430 then communicates the command to receive a replacement SNMP subagent to the SNMP system management support unit 210 on the ADC device platform 100. As previously discussed, the system management support unit 210 communicates with the remote computing system 120 using sockets, TCP, UDP, and UDP+. Thus, the new SNMP subagent 212 arrives at the ADC device platform through the SNMP system management support unit 210. The system management support unit 210 provides a DLL or COM interface for the SNMP subagents 512, as previously discussed. For example, the new SNMP subagent 212 may be stored as a file having a DLL extension that is loaded only when needed. Once the remote technician 601 has completed the downloading of the new SNMP subagent 212, the remote service technician 601 may then perform additional diagnostic steps to ensure that the new SNMP subagent 212 is operating within acceptable parameters ("step 1204").

Figure 13:
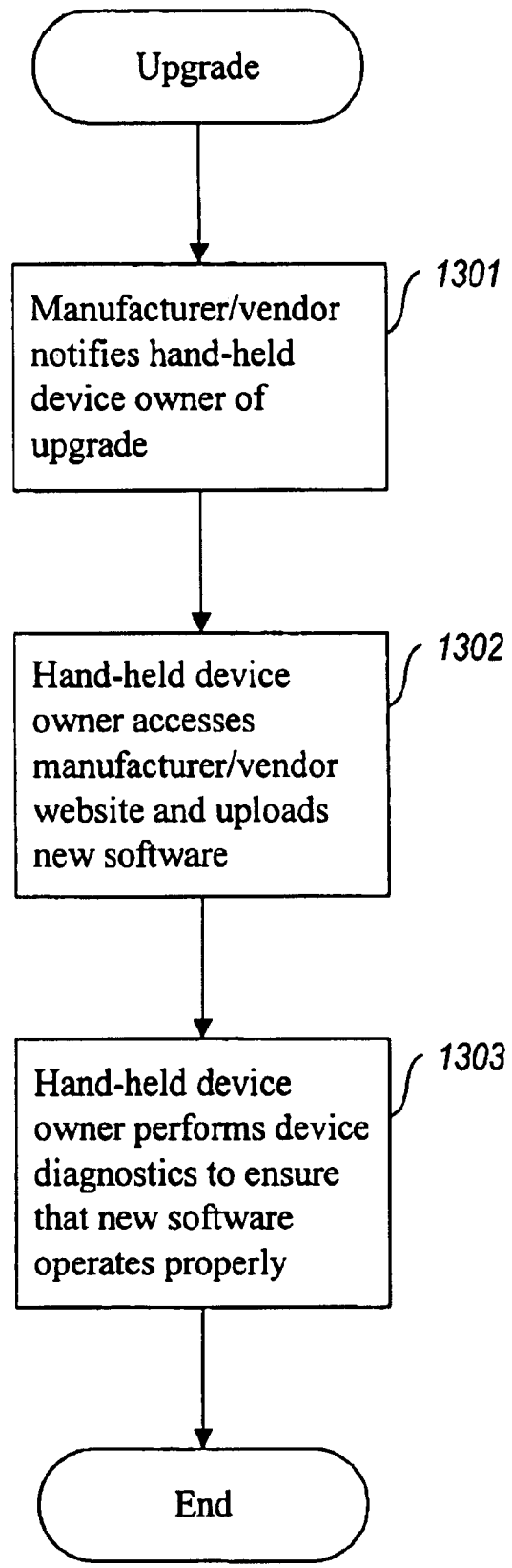
FIG. 13 provides a flowchart illustrating a procedure through which the ADC device platform operator downloads software upgrades for elements of the ADC device platform.

FIG. 13 provides a flowchart illustrating a procedure that may be utilized by the device operator to download upgrades to the ADC device platform 100. The manufacturer and/or vendor notify the device operator that an upgrade is available for the ADC device platform's software ("step 1301"). The ADC device platform 100 operator then accesses a manufacturer or vendor data repository, such as a website on the World Wide Web, and downloads new software ("step 1302"). The software download may be performed in the manner indicated above for the loading of new SNMP subagents. The ADC device owner may then perform diagnostic tests to insure that the new software operates properly ("step 1303").

The ADC device platform 100 of the invention may be applied in connection with systems and methods described in a Patent Application entitled "Automatic Data Collection Device Having a Network Communications Capability," U.S. Provisional Application No. 60/084,272, filed on May 4, 1998, and assigned to a common assignee, which is hereby incorporated by reference.

The ADC device platform 100 of the invention may also be applied in connection with systems and methods for more accurate bar code scanning. Such a system is more clearly described in a patent application entitled "Method for Decoding Bar Code Symbols by Declaring Erasures of Element Widths Based on Soft Decision of Measured Widths," U.S. application Ser. No. 09/007,277, filed on Jan. 14, 1998, and assigned to a common assignee, which is hereby incorporated by reference.

The ADC device platform 100 of the invention may also be applied in conjunction with improved scanning devices and procedures. One applicable approach is more clearly described in a patent application entitled "Method of Auto-discriminating in Symbology Reader Employing Prioritized and Updated Table of Symbologies," U.S. application Ser. No. 09/006,693, filed on Jan. 14, 1998, and assigned to a common assignee, which is hereby incorporated by reference.

Although specific embodiments of, and examples for, the invention are described herein for illustrative purposes, various equivalent modifications are possible within the scope of the invention, as will be recognized by those skilled in the relevant art. The teachings provided herein of the invention can be applied to other data symbol imaging systems, not necessarily the exemplary ADC device platform having ADC devices described above. Various exemplary data symbol enablement systems, and accordingly, various other device input and output enablement systems can be employed under the invention. The invention is applicable to systems for reading visual indicia of other stored images. The ADC device platform may operate with protocols and languages in addition to those specifically disclosed herein. For example, the ADC device platform is not limited to operations using HTTP, HTML, DHTML, XML, UDP, TCP/IP, FTP, SNMP, and TFTP but is equally applicable to other similar languages and protocols. For example, the remote HTML browser may read and receive pages in HTML, DHTML, XML, and any other similar language.

Aspects of the invention can be applied to not only diagnosing and correcting anomalies within an ADC device platform, but also diagnosing and correcting anomalies associated with external devices, such as computerized servers and printers. For example, in an alternative embodiment, the invention aids a device operator in determining that some aspect of an external connection between the ADC device platform and a remote server has failed or is otherwise not enabled. Thus, the invention finds broad applicability in diagnosing and correcting virtually any malfunction which may arise with regard to an ADC device platform, a data collection terminal, and a data symbol imaging system.

The embodiments of the invention disclosed hereinabove have been discussed primarily with regard to hand-hand devices, such as hand-held data collection terminals. However, the invention finds equal applicability in stationary data collection terminals, such as a permanently mounted device, and in desktop personal computers.

All of the above U.S. patents and applications are incorporated herein by reference as if set forth in their entirety.

These and other changes can be made to the invention in light of the above detailed description. In general, in the following claims, the terms used should not be construed to limit the invention to the specific embodiments disclosed in the specification and the claims, but should be construed to include all ADC device platforms, data collection terminals, and data symbol imaging systems that operate under the claims set forth hereinbelow. Accordingly, the invention is not limited by the disclosure, but instead its scope is to be determined entirely by the following claims.

What is claimed is:

1. A system for diagnosing anomalies in an automatic data collection ("ADC") device platform having a reportedly anomalous element, comprising:
   a remote computing system that sends a diagnostic query over a communications network to the ADC device platform;
   a Simple Network Management Protocol ("SNMP") master agent in the ADC device platform that receives the diagnostic query, sends the diagnostic query to the reportedly anomalous element, receives a response to diagnostic query, and sends the response to the remote computing system; and a diagnostic analysis unit in the remote computing system that analyzes the response and identifies an anomaly associated with the reportedly anomalous element.

2. The system of claim 1, further comprising:

an anomaly reporting subsystem on the ADC device platform that sends an alert message to the remote computing system to report the reportedly anomalous element on the ADC device platform; and a pre-diagnostic unit in the remote computing system that analyzes the alert message to identify an appropriate diagnostic query.

3. The system of claim 1, further comprising:

an anomaly reporting subsystem on the ADC device platform that alerts the remote computing system of the reportedly anomalous element on the ADC device platform by generating and sending the remote computing system an electronic mail message that identifies a reported anomaly.

4. The system of claim 1 wherein the diagnostic analysis unit also suggests a recommended course of action to restore the reportedly anomalous element to proper operation.

5. The system of claim 1, further comprising:

a web browser in the remote computing system that directs communications to the ADC device platform;

a diagnostic analysis server containing Hypertext Markup Language ("HTML") documents, Dynamic Hypertext Mark-Up Language ("DHTML") documents, and Extensible Mark Up Language ("XML") documents wherein the HTML documents, DHTML documents, and XML documents contain diagnostic application programs suitable for use with the ADC device platform; and a diagnostic selector in the remote computing system that selects a document from the diagnostic analysis server and directs the web browser to load a diagnostic application program from the document wherein the diagnostic application program generates the diagnostic query.

6. The system of claim 1 wherein the diagnostic analysis unit determines that the reportedly anomalous element is operating within expected parameters.

7. The system of claim 1 wherein the response contains retrieved performance data from the reportedly anomalous element and wherein the diagnostic analysis unit analyzes the retrieved performance data by comparing the retrieved performance data against a set of performance characteristics for the reportedly anomalous element.

8. The system of claim 1, further comprising:

an ADC reader on the ADC device platform wherein the ADC reader has been identified as the reportedly anomalous element;

a test ADC pattern readable by the ADC reader when operating normally; and a testing unit on the remote computing system that directs the ADC reader to read the test ACD pattern, receives data produced by the reading of the test ACD pattern, compares the received data against data normally generated by reading the test ADC pattern, and sends the comparison to the diagnostic analysis unit.

9. A system for diagnosing anomalies in an automatic data collection ("ADC") device platform having a reportedly anomalous element, comprising:

a remote computing system that sends a diagnostic query over a communications network to the ADC device platform;

a Simple Network Management Protocol ("SNMP") master agent in the ADC device platform that receives the diagnostic query, sends the diagnostic query to the reportedly anomalous element, receives a response to diagnostic query, and sends the response to the remote computing system;

a diagnostic analysis unit in the remote computing system that analyzes the response and identifies an anomaly associated with the reportedly anomalous element;

a first translator in the ADC device platform that translates the diagnostic query into an appropriate format for retrieving performance data associated with the reportedly anomalous element; and a second translator in the ADC device platform that translates retrieved performance data associated with the reportedly anomalous element into an appropriate communications format for transmission as the response to the remote computing system.

10. A system for identifying anomalies in an automatic data collection ("ADC") device platform having a plurality of elements, comprising:

at least one remote computing system that receives anomaly data over at least one communications network from the ADC device platform, where the anomaly data is unrelated to a switching performance of the communications network;

at least one communications unit in the ADC device platform that formats the anomaly data for transmission over the at least one communications network and sends the anomaly data to the at least one remote computing system; and at least one anomaly report generator that collects anomaly reporting data and forwards the anomaly reporting data as anomaly data to the at least one communications unit, wherein in response to receiving the anomaly data, the remote computing system sends at least one diagnostic query over the at least one communications network to the ADC device platform, the system further comprising:

at least one first translator in the ADC device platform that translates the at least one diagnostic query into an appropriate format for retrieving performance data associated with the reportedly anomalous element;

at least one second translator in the ADC device platform that translates retrieved performance data associated with the reportedly anomalous element into an appropriate communications format for transmission to the remote computing system; and at least one diagnostic analysis unit in the remote computing system that analyzes the retrieved performance data associated with the reportedly anomalous element and identifies an anomaly associated with the reportedly anomalous element.

11. The system of claim 10, further comprising:

at least one pre-diagnostic unit in the remote computing system that analyzes received anomaly data and identifies an element of the plurality of elements associated with the reported anomaly.

12. The system of claim 10 wherein the at least one diagnostic analysis unit in the remote computing system analyzes the anomaly data and identifies the anomaly associated with a reportedly anomalous element of the plurality of elements by comparing performance data for the reportedly anomalous element against a set of performance characteristics for the reportedly anomalous element.

13. A system for identifying anomalies in an automatic data collection ("ADC") device platform having a plurality of elements, comprising:

at least one remote computing system that receives anomaly data over at least one communications network from the ADC device platform, where the anomaly data is unrelated to a switching performance of the communications network;

at least one communications unit in the ADC device platform that formats the anomaly data for transmission over the at least one communications network and sends the anomaly data to the at least one remote computing system; and at least one anomaly report generator that collects anomaly reporting data and forwards the anomaly reporting data as anomaly data to the at least one communications unit;

at least one web browser in the remote computing system that communicates with the ADC device platform;

at least one diagnostic analysis server containing Hypertext Markup Language ("HTML") documents, Dynamic Hypertext Mark-Up Language ("DHTML") documents, and Extensible Mark Up Language ("XML") documents wherein the HTML documents, DHTML documents, and XML documents contain diagnostic application programs suitable for use with the ADC device platform; and at least one diagnostic selector in the remote computing system that uses received anomaly data to select an appropriate document from the at least one diagnostic analysis server and directs the at least one web browser to load a diagnostic application program from the document wherein the diagnostic application program allows a diagnostic query to be sent over the communications network to the ADC device platform.

14. A method for diagnosing anomalies in an automatic data collection ("ADC") device platform having a reportedly anomalous element, comprising:

sending a diagnostic query over a communications network to the ADC device platform from a remote computing system, where the diagnostic query is unrelated to a switching performance of the communications network;

receiving the diagnostic query at a simple network management protocol ("SNMP") master agent in the ADC device platform;

sending the diagnostic query from the SNMP master agent to the reportedly anomalous element;

receiving a response to the diagnostic query;

sending the response to the remote computing system; and analyzing the response in a diagnostic analysis unit in the remote computing system to identify an anomaly associated with the reportedly anomalous element.

15. The method of claim 14, further comprising:

sending an alert message from an anomaly reporting subsystem on the ADC platform to the remote computing system to report the reportedly anomalous element on the ADC platform; and analyzing the alert message in a prediagnostic unit in the remote computing system to identify an appropriate diagnostic query.

16. The method of claim 14, further comprising:

alerting the remote computing system of a reportedly anomalous element on the ADC device platform by generating and sending the remote computing system an electronic mail message that identifies the unreported anomaly.

17. The method of claim 14, further comprising:

determining a recommended course of action to restore the reportedly anomalous element to proper operation.

18. The method of claim 14, further comprising:

selecting a document from a diagnostic analysis server and loading a diagnostic application program from the document into the remote computing system, wherein the diagnostic application program generates the diagnostic query.

19. The method of claim 14 wherein the response contains retrieved performance data from the reportedly anomalous element, further comprising;

analyzing the retrieved performance data by comparing the retrieved performance against a set of performance characteristics for the reportedly anomalous element.

20. The method of claim 14 wherein a machine-readable symbol reader on the ADC device platform has been identified as the reportedly anomalous element, further comprising:

directing the machine-readable symbol reader to read a test ADC pattern;

receiving data produced by the reading of the test ADC pattern;

comparing the received data against data normally generated by reading the test ADC pattern; and sending the comparison to the diagnostic analysis unit.

21. The method of claim 14, further comprising;

selecting a document from a diagnostic analysis server;

loading an analytical application program from the document into the remote computing system, wherein the analytical application program provides the diagnostic analysis unit with analytical tools appropriate for the reportedly anomalous element.

22. A method of configuring an automatic data collection device, comprising:

receiving a replacement SNMP subagent to an SNMP system management support unit on the automatic data collection device;

storing the received replacement SNMP subagent to a memory in the automatic data collection device; and performing diagnostic testing on the replacement SNMP subagent.

23. The method of claim 22, further comprising:

receiving a notice that a replacement SNMP subagent is available; and accessing a remote site to download the replacement SNMP subagent.

24. The method of claim 22 wherein storing the received replacement SNMP subagent to a memory in the automatic data collection device includes providing a DLL or COM interface for the SNMP subagent.

25. A system for identifying anomalies in a printer having a plurality of elements, comprising:

at least one remote computing system that receives anomaly data over at least one communications network from the printer;

at least one communications unit in the printer that formats the anomaly data for transmission over the at least one communications network and sends the anomaly data to the at least one remote computing system; and at least one anomaly report generator that collects anomaly reporting data and forwards the anomaly reporting data as anomaly data to the at least one communications unit wherein in response to receiving the anomaly data, the remote computing system sends at least one diagnostic query over the at least one communications network to the printer, the system further comprising:

at least one first translator in the printer that translates the at least one diagnostic query into an appropriate format for retrieving performance data associated with the reportedly anomalous element;

at least one second translator in the printer that translates retrieved performance data associated with the reportedly anomalous element into an appropriate communications format for transmission to the remote computing system; and at least one diagnostic analysis unit in the remote computing system that analyzes the retrieved performance data associated with the reportedly anomalous element and identifies an anomaly associated with the reportedly anomalous element.

26. The system of claim further 25, comprising:

at least one pre-diagnostic unit in the remote computing system that analyzes received anomaly data and identifies an element of the plurality of elements associated with the reported anomaly.

27. The system of claim 25, further comprising:

at least one diagnostic analysis unit in the remote computing system that analyzes the anomaly data and identifies an anomaly associated with a reportedly anomalous element of the plurality of elements by comparing performance data for the reportedly anomalous element against a set of performance characteristics for the reportedly anomalous element.

28. A system for identifying anomalies in a printer having a plurality of elements, comprising:

at least one remote computing system that receives anomaly data over at least one communications network from the printer;

at least one communications unit in the printer that formats the anomaly data for transmission over the at least one communications network and sends the anomaly data to the at least one remote computing system;

at least one anomaly report generator that collects anomaly reporting data and forwards the anomaly reporting data as anomaly data to the at least one communications unit;

at least one web browser in the remote computing system that communicates with the ADC device platform;

at least one diagnostic analysis server containing Hypertext Markup Language ("HTML") documents, Dynamic Hypertext Mark-Up Language ("DHTML") documents, and Extensible Mark Up Language ("XML") documents wherein the HTML documents, DHTML documents, and XML documents contain diagnostic application programs suitable for use with the printer; and at least one diagnostic selector in the remote computing system that uses received anomaly data to select an appropriate document from the at least one diagnostic analysis server and directs the at least one web browser to load a diagnostic application program from the document wherein the diagnostic application program allows a diagnostic query to be sent over the communications network to the printer.

29. A method for diagnosing anomalies in a printer having a reportedly anomalous element, comprising:

sending a diagnostic query over a communications network to the printer from a remote computing system;

receiving the diagnostic query at a simple network management protocol ("SNMP") master agent in the printer;

sending the diagnostic query from the SNMP master agent to the reportedly anomalous element;

receiving a response to the diagnostic query;

sending the response to the remote computing system; and analyzing the response in a diagnostic analysis unit in the remote computing system to identify an anomaly associated with the reportedly anomalous element.

30. The method of claim 29, further comprising:

sending an alert message from an anomaly reporting subsystem on the printer to the remote computing system to report the reportedly anomalous element on the printer; and analyzing the alert message in a prediagnostic unit in the remote computing system to identify an appropriate diagnostic query.

31. The method of claim 29, further comprising:

alerting the remote computing system of a reportedly anomalous element on the printer by generating and sending the remote computing system an electronic mail message that identifies the unreported anomaly.

32. The method of claim 29, further comprising:

automatically providing a recommended course of action to restore the reportedly anomalous element to proper operation.

33. The method of claim 29, further comprising:

selecting a document from a diagnostic analysis server and loading a diagnostic application program from the document into the remote computing system, wherein the diagnostic application program generates the diagnostic query.

34. The method of claim 29 wherein the response contains retrieved performance data from the reportedly anomalous element, further comprising;

analyzing the retrieved performance data at the remote computing system by comparing the retrieved performance against a set of performance characteristics for the reportedly anomalous element.

35. The method of claim 29, further comprising;

selecting a document from a diagnostic analysis server;

loading an analytical application program from the document into the remote computing system, wherein the analytical application program provides the diagnostic analysis unit with analytical tools appropriate for the reportedly anomalous element.

36. A method for diagnosing anomalies in a machine-readable symbol reader having a reportedly anomalous element, comprising:

sending a diagnostic query over a communications network to the machine-readable symbol reader platform from a remote computing system;

receiving the diagnostic query at a simple network management protocol ("SNMP") master agent in the machine-readable symbol reader platform;

sending the diagnostic query from the SNMP master agent to the reportedly anomalous element;

receiving a response to the diagnostic query;

sending the response to the remote computing system; and analyzing the response in a diagnostic analysis unit in the remote computing system to identify an anomaly associated with the reportedly anomalous element.

37. The method of claim 36, further comprising:

sending an alert message from an anomaly reporting subsystem on the machine-readable symbol reader platform to the remote computing system to report the reportedly anomalous element on the machine-readable symbol reader platform; and analyzing the alert message in a prediagnostic unit in the remote computing system to identify an appropriate diagnostic query.

38. The method of claim 36, further comprising:

alerting the remote computing system of a reportedly anomalous element on the machine-readable symbol reader platform by generating and sending the remote computing system an electronic mail message that identifies the unreported anomaly.

39. The method of claim 36, further comprising:

automatically providing a recommended course of action to restore the reportedly anomalous element to proper operation.

40. The method of claim 36, further comprising:

selecting a document from a diagnostic analysis server and loading a diagnostic application program from the document into the remote computing system, wherein the diagnostic application program generates the diagnostic query.

41. The method of claim 36, wherein the response contains retrieved performance data from the reportedly anomalous element, further comprising;

analyzing the retrieved performance data by comparing the retrieved performance against a set of performance characteristics for the reportedly anomalous element.

* * * * *